US007165304B2

(12) United States Patent
Smith et al.

(10) Patent No.: US 7,165,304 B2
(45) Date of Patent: *Jan. 23, 2007

(54) BLOCK ATTACHER APPARATUS AND METHOD

(75) Inventors: Dustin W. Smith, Carthage, MO (US); Dale De'Crescenzo, Carthage, MO (US)

(73) Assignee: L&P Property Management Company, South Gate, CA (US)

( * ) Notice: Subject to any disclaimer, the term of this patent is extended or adjusted under 35 U.S.C. 154(b) by 210 days.

This patent is subject to a terminal disclaimer.

(21) Appl. No.: 10/817,188

(22) Filed: Apr. 2, 2004

(65) Prior Publication Data

US 2004/0187286 A1 Sep. 30, 2004

Related U.S. Application Data

(63) Continuation-in-part of application No. 10/144,959, filed on May 14, 2002, now Pat. No. 6,763,567.

(51) Int. Cl.
*B23P 11/00* (2006.01)

(52) U.S. Cl. ............................ 29/430; 29/772; 29/783; 29/809; 29/281.5; 29/791; 29/795; 29/711

(58) Field of Classification Search .................. 29/772, 29/783, 784, 799, 809, 823, 281.5, 464, 430, 29/428, 429, 525, 789, 525.01, 798, 701, 29/714, 716, 791, 795, 709, 711; 227/2–6
See application file for complete search history.

(56) References Cited

U.S. PATENT DOCUMENTS 3,537,168 A * 11/1970 Ellsworth et al. .......... 29/564.2

(Continued)

FOREIGN PATENT DOCUMENTS

EP 0512970 11/1992

(Continued)

OTHER PUBLICATIONS www.vikingeng.com; Apr. 18, 2002.

(Continued)

*Primary Examiner*—David P. Bryant
*Assistant Examiner*—Christopher M. Koehler
(74) *Attorney, Agent, or Firm*—Husch & Eppenberger LLC; Grant D. Kang

(57) ABSTRACT

A block attacher for attaching blocks to slats as stringers for pallets includes a slat dispenser disposed to dispense individual slats to a slat driver, the slat driver being selectively positionable. A first block dispenser dispenses a block to an assembly station where a position fixture is disposed to operatively cooperate with the slat driver and the block dispenser to position the dispensed block abutting the individual slat when the slat driver is in a first selected position. At least one other position fixture is disposed to operatively cooperate with the slat driver to position a second dispensed block abutting the individual slat when the slat driver is in a second selected position. The subsequent blocks may be dispensed by the same block dispenser as the first block, or by different dispensers. A block fixator is disposed to fix the first dispensed block to the slat when said slat driver is in the first selected position and further disposed to attach the at least one other block to the individual slat when the slat driver is in at least one other position.

40 Claims, 21 Drawing Sheets

U.S. PATENT DOCUMENTS

| | | | | | |
|---|---|---|---|---|---|
| 3,755,871 | A | | 9/1973 | Nelson, Jr. | 29/200 |
| 3,945,549 | A | | 3/1976 | Colson | 227/45 |
| 3,949,458 | A | * | 4/1976 | Saidel | 29/416 |
| 3,968,560 | A | * | 7/1976 | Vial | 29/430 |
| 3,982,313 | A | * | 9/1976 | Nelson, Jr. | 29/432 |
| 4,392,600 | A | | 7/1983 | Billett et al. | 227/50 |
| 4,403,388 | A | * | 9/1983 | Belcher | 29/429 |
| 4,489,874 | A | * | 12/1984 | Worst et al. | 227/7 |
| 4,492,016 | A | | 1/1985 | Smets et al. | 29/432 |
| 4,793,540 | A | | 12/1988 | Mangan | 227/7 |
| 4,824,004 | A | | 4/1989 | Hanson | 227/152 |
| 5,249,352 | A | | 10/1993 | Landers | 29/432 |
| 5,355,575 | A | | 10/1994 | Self | 29/430 |
| 5,379,513 | A | | 1/1995 | Thompson et al. | 29/772 |
| 5,547,002 | A | | 8/1996 | Runnebaum | 144/332 |
| 5,555,617 | A | * | 9/1996 | Pope | 29/772 |
| 5,943,766 | A | | 8/1999 | Beane | 29/772 |
| 6,176,009 | B1 | * | 1/2001 | Inman | 29/772 |
| 6,430,800 | B1 | * | 8/2002 | Buck | 29/430 |
| 6,763,567 | B1 | * | 7/2004 | Smith et al. | 29/430 |

FOREIGN PATENT DOCUMENTS

| | | |
|---|---|---|
| ES | 2027487 | 6/1992 |
| FR | 2418704 | 9/1979 |
| FR | 2672001 | 7/1992 |
| FR | 2814733 | 4/2002 |

OTHER PUBLICATIONS www.smcllc.com; Apr. 17,2002.
"Viking" pamphlet.

* cited by examiner

BLOCK ATTACHER APPARATUS AND METHOD

CROSS-REFERENCE TO RELATED APPLICATIONS

This application is a continuation in part of U.S. application Ser. No. 10/144,959 filed May 14, 2002 now U.S. Pat. No. 6,763,567.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

The present invention is in the field of assembling pallets and in particular assembling subcomponents of pallets.

2. Related Art

In warehousing, two types of pallets have traditionally been used. All of them included a "mat" which is a series of boards or slats that are on a top level upon which product is placed. Below the mat are vertical supports. Below the vertical supports are generally several slats to be placed on the warehouse floor. The vertical separators maintain a space into which fork lift forks may be inserted for lifting and moving the pallets. One type of vertical spacer is a vertical board with a slots or grooves cut into it for receiving the forks. Block pallets maintain the vertical space with spaced blocks.

Warehousemen have come to prefer block pallets. Slotted pallets require a more exact alignment of the fork truck with the pallet, which can become problematic in constricted spaces such as the corners of warehouses. Accordingly, block pallets have become preferred since the forks of fork trucks may enter the pallet from a wider range of insertion angles.

Pallet assemblers offer pallets to customer warehousemen in a variety of dimensions and configurations. In order to achieve economic efficiencies, pallet assemblers prefer to retain inventories of pallet assembly components, which are only assembled upon receiving an order for them. A preferred component is a single floor slat with blocks already attached to it. These individual slats (or "stringers") may be assembled with mats in multiple arrangements. The slat and block assemblies may further be assembled in a variety of dimensions. Several dimensions have become standard, including 36 inch, 48 inch and 60 inch long versions. The blocks of these block/slats assemblies are also spaced in standardized fashions. On occasion, block spacing may be varied.

Traditionally, pallets and the slat/block components used to make them have been assembled manually. Some automated devices have been developed to facilitate the assembly of pallets. These devices include relatively inexpensive devices that perform only small sub portions of pallet assembly and also include large scale pallet assembly devices that are capable of automatically producing several hundred pallets per hour.

There are many disadvantages associated with various types of prior art automated pallet assembly devices. One obvious such disadvantage is the cost of such assembly devices, which can make large automated assembly devices uneconomical for production facilities that do not have the demand for operating such devices continually. Other less complex and less expensive assembly devices require slats, stringers, blocks, or other pallet components to be manually positioned in their relative assembled positions or within jigs or carriages. Such manual positioning tends to increase labor costs and/or slow production rates. At least some relatively small scale assembly devices, such as the device disclosed in U.S. Pat. No. 4,403,388, automatically position at least some pallet components in their assembled position prior to assembling such components.

There is a need in the art for more rapid, economical production. There is a need in the art for automation of slats and block assembly. There is further a need for an automated system that can accommodate varying dimensions and occasional customized dimensions of block slat components. There is a continuing need for improving economy, volume and speed of production.

SUMMARY OF THE INVENTION

It is in view of the above problems that the present invention was developed. The present invention is an improved block/slat component assembly apparatus and method. One aspect of the invention generally pertains to pallet assembly device that preferably comprises a slat dispensing station, a block dispensing station, a clamping station, a slat conveying mechanism, a block conveying mechanism, and an automatic fastening device. The slat dispensing station is configured and adapted to hold a plurality of pallet slats stacked vertically one above another. Likewise, the block dispensing station is configured and adapted to hold a plurality of pallet blocks stacked vertically one above another. The clamping station is configured and adapted to bias a block into engagement with a slat. The slat conveying mechanism operatively connects the slat dispensing station to the clamping station and is configured and adapted to repetitively engage and separate a lower most slat from a plurality of slats positioned in the slat dispensing station and to transfer such a slat to the clamping station. The slat conveying mechanism is further configured and adapted to position that slat at first, second, and third distinct stopped positions relative to the clamping station. The block conveying mechanism is configured and adapted to repetitively engage and separate a lower most block from a plurality of blocks positioned in the block dispensing station and to transfer that block to the clamping station. The block conveying mechanism is further configured and adapted to position blocks above the slat when the slat is stopped in any one of the first, second, and third distinct stopped positions. The automatic fastening device is configured and adapted to force a fastener upwardly through the slat and into a block when the slat and has been stopped in any one of the first, second and third positions and such a block is being bias into engagement with the slat.

Another aspect of the invention generally pertains to pallet assembly device that preferably comprises a component dispensing station, a clamping station, and a component mechanism. The component dispensing station is configured and adapted to hold a plurality of pallet components and the clamping station is configured and adapted to bias pallet components together. The component conveying mechanism operatively connects the component dispensing station to the clamping station and comprises a plurality of wheels that are mounted to the assembly device for rotation about separate axes. The wheels are positioned to simultaneously engage opposite sides of a pallet component when such a component is being transferred by the component conveying mechanism to the clamping station. The component conveying mechanism also comprises a drive motor that is operatively connected to at least one of the plurality of wheels in a manner allowing the drive motor to rotationally drive and rotationally stop at least one of the plurality of wheels to thereby adjust the position of a pallet component relative to the clamping station.

Yet another aspect of the invention pertains to a method of assembling a pallet that preferably comprises the step of providing an automated pallet assembly apparatus having an assembly path, a slat dispensing station, and a block dispensing station, with the assembly path operatively connecting the slat dispensing station to the block dispensing station. The method further preferably comprises providing a plurality of slats to the slat dispensing station and providing a plurality of blocks to the block dispensing station.

The method also preferably comprises utilizing the assembly apparatus to automatically move a first one of the plurality of slats longitudinally along the assembly path from the slat dispensing station toward the block dispensing station and to automatically stop the movement of the first slat at a first position along the assembly path. In the first position, a first longitudinal end of the first slat is positioned adjacent the block dispensing station along the assembly path. The method yet further preferably comprises automatically biasing a first block of the plurality of blocks into engagement with the first slat, when it is stopped in the first position, and automatically fastening the first slat to the first block while the first slat and the first block are being biased into engagement with each other.

Still further, the method preferably comprises utilizing the assembly apparatus to automatically longitudinally move the first slat from the first position and to automatically stop the movement of the first slat at a second position along the assembly path. The second position is further along the assembly path from the slat dispensing station than the first position and the method preferably further comprises automatically biasing a second block into engagement with the first slat, when it is in the second position, and automatically fastening the first slat to the second block while the first slat and the second block are being biased into engagement with each other.

Yet further, the method preferably comprises utilizing the assembly apparatus to automatically longitudinally move the first slat from the second position and to automatically stop the movement of the first slat at a third position along the assembly path. In the third position, the longitudinal end of the slat opposite its first longitudinal end is positioned adjacent the block dispensing station along the assembly path. Finally, the method yet further preferably comprises automatically biasing a third block into engagement with the first slat, when it is in the third position, and automatically fastening the first slat to the third block while the first slat and the third block are being biased into engagement with each other.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
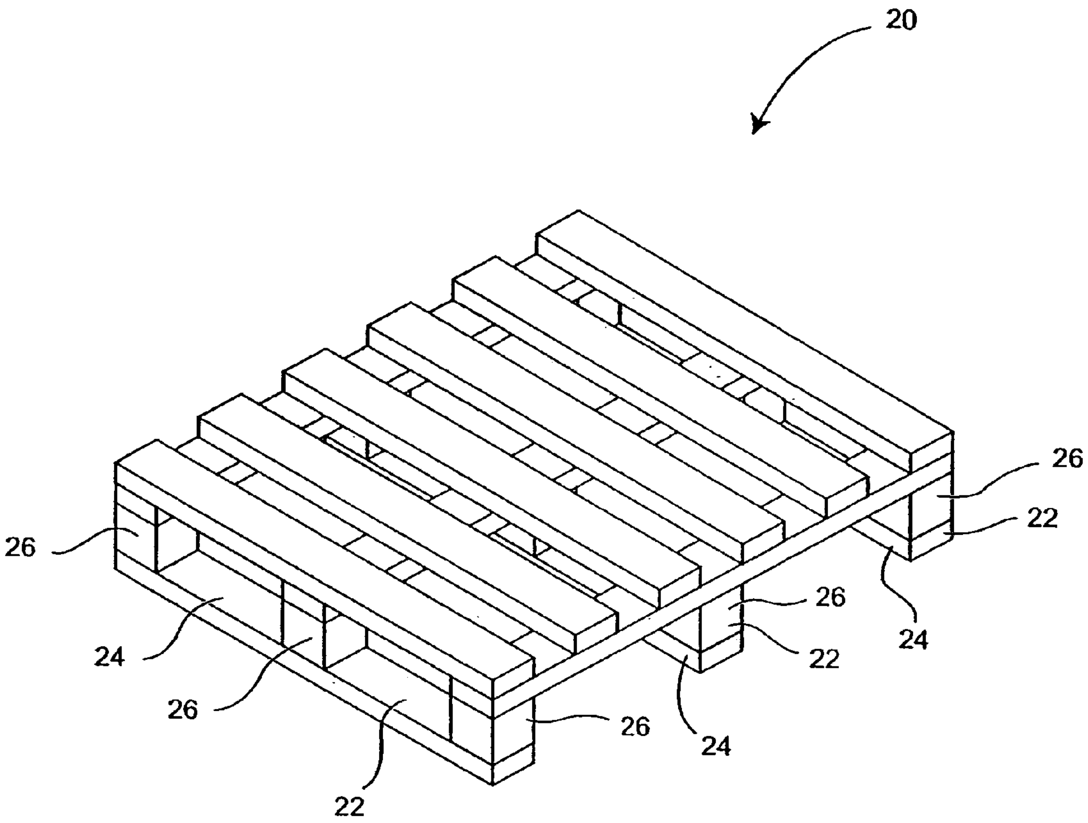
FIG. 1 is an isometric view of a standard block-style pallet.
Figure 2:
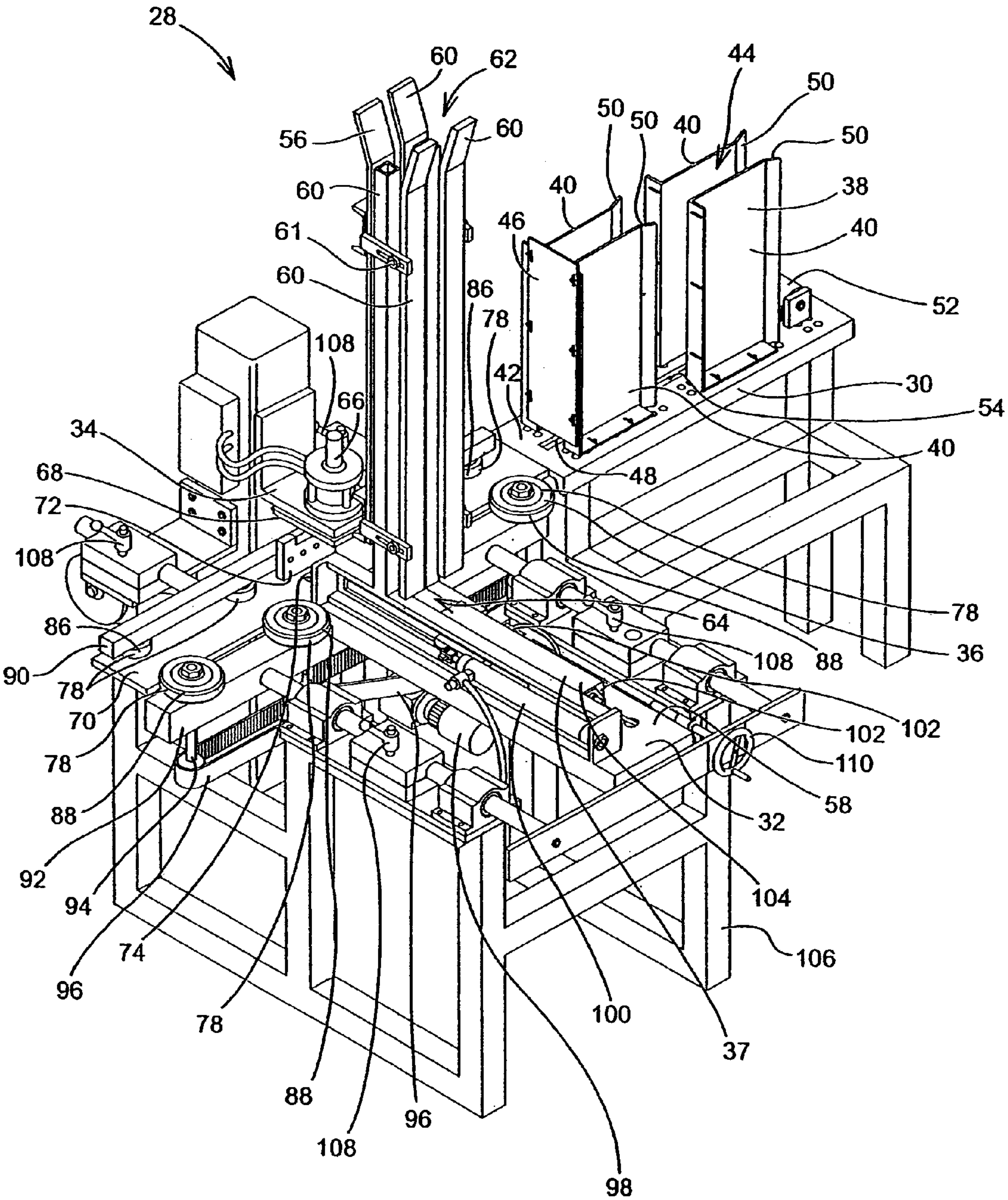
FIG. 2 illustrates an isometric view off the preferred embodiment of a pallet assembly device in accordance with the invention.

Referring to the accompanying drawings in which like reference numbers indicate like elements, the pallet assembly devices of the present invention are specifically configured and adapted to it assemble portions of a standard block-style pallet of the type shown in FIG. 1. In particular, the pallet assembly device of the preferred embodiment is configured and adapted to assemble the stringers 22 of block-style pallets 20, which themselves each comprise a single slat 24 with a block 26 attached at each longitudinal end thereof and at least one more block positioned centrally therebetween.

In general, the pallet assembly device 28 of a first embodiment is shown in FIGS. 2–9 and comprises a slat dispensing station 30, a block dispensing station 32, and a clamping station 34. The pallet assembly device 28 further includes a slat conveying mechanism 36 and a block conveying mechanism 37. These dispense and move individual slats to make individual block stringers. The slat conveying mechanism 36 is configured to move slats longitudinally from the slat dispensing station 30 through the clamping station 34, thereby defining an assembly path along which such slats travel. The block conveying mechanism 37 is configured to move blocks from the block dispensing station 32 to the clamping station 34.

The slat dispensing station 30 of the pallet assembly device 28 of the first depicted embodiment generally comprises a receiving bin or magazine 38 that is formed of a plurality of opposed vertical side wall members 40 that are mounted to a horizontal surface 42. The side wall members 40 are spaced apart from each other such that a slot 44 is formed that has a width slightly larger than the width of the slats 24 being used to form the stingers 22 of the block-style pallets 20. A vertical end wall 46 is preferably mounted to a pair of the side wall members 40 in a manner such that it substantially closes the slot 44 at one end. However, the end wall 46 is mounted to the side wall members 40 in a manner such that it is spaced above the horizontal surface 42 by a distance greater than the thickness of each of the slats 24 but less than twice such thickness. The opposite ends 50 of the side wall members 40 remain open and are preferably flared apart. The pair of side wall members 40 and the end wall 46 are preferably secured to each other and to the horizontal surface 42 using bolts passed through slotted holes so as to allow the width of the slot 44 and the height of the opening 48 to be adjusted to accommodate various alternative sizes of slats 24. A roll pin 52 is preferably mounted to the horizontal surface 42 adjacent the open end of the slot 44. Finally, an elongated slot 54 extends through the horizontal surface 42 along the length of the slot 44 of the receiving bin 38 to accommodate a portion of the slat conveying mechanism 36 of the pallet assembly device 28, as described below.

The block dispensing station 32 of the pallet assembly device 28 of the preferred embodiment comprises a block holder member 56 or magazine that extends vertically from a horizontal block holder surface 58. The block holder member 56 preferably comprises a plurality of bar members 60 that are spaced from each other to form a slot 62 that is dimensioned to receive and hold a plurality of stacked blocks 26 of the type used to form the block-style pallets 20. Adjustment knobs 61 are provided to allow the space between the bar members 60 to be adjusted to accommodate different sizes of blocks 26. The bar members 56 are spaced above from the horizontal block holder surface 58 by a distance larger than the height of a block 26, but less than the height of two blocks, in a manner such that an opening 64 is formed at the base of the block holder. The opening allows a lower most block 26 resting on the horizontal block holder surface 58 to pass horizontally out of the slot 62 of block holder 56 via the block conveying mechanism 37 as is described below.

The clamping station 34 of the pallet assembly device 28 of the first depicted embodiment comprises a fluid cylinder 66 supporting an upper horizontal plate 68 that opposes a lower base plate 70 therebeneath. A vertically oriented side plate 72 is positioned adjacent one side of the upper horizontal plate 68 and extends between the upper horizontal plate and the lower base plate 70. The clamping station 34 further comprises an automatic fastening device (not shown) positioned beneath the lower base plate 70. A fastener slot 74 extends through the base plate 70 and is aligned with the automatic fastening device. The fluid cylinder 66 is configured to raise and lower the upper horizontal plate 68 relative to the lower base plate 70. This assembly is a positioning fixture that maintains a block abutted to a slat at a preconfigured location on the slat when the slat is stopped at a selected position. The automatic fastening device is preferably mechanical stapler of the type that cuts and forms staples from a selectable length of wire, such as from a spool of wire. The automatic fastening device or fixator is configured and adapted to drive such staples upwardly through the fastener slot 74 of the lower base plate 70.

Figure 3:
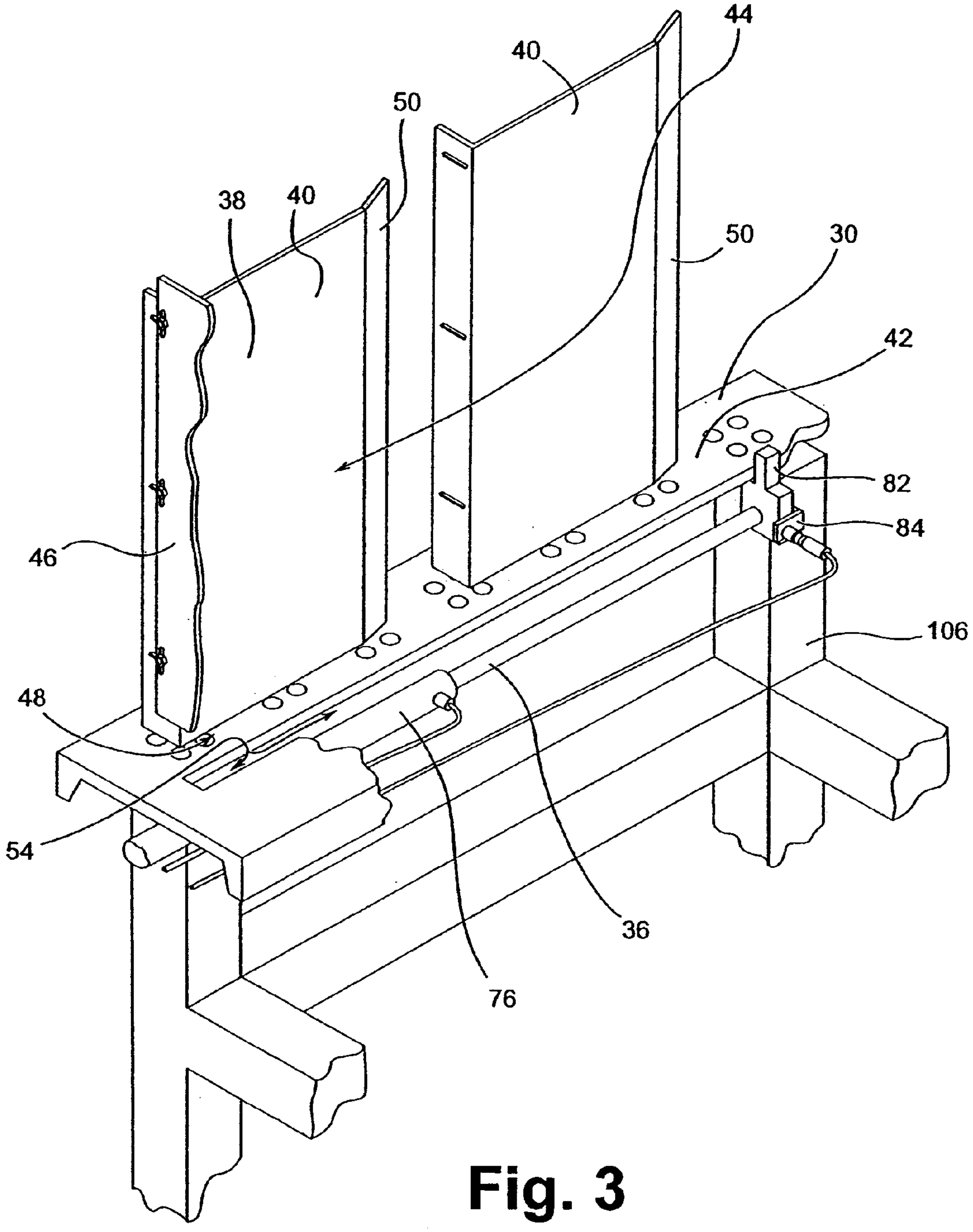
FIG. 3 illustrates a partial detail view of the slat dispensing station and a portion of the slat conveying mechanism of the pallet assembly device of FIG. 2, shown with portions thereof removed for clarity.
Figure 4:
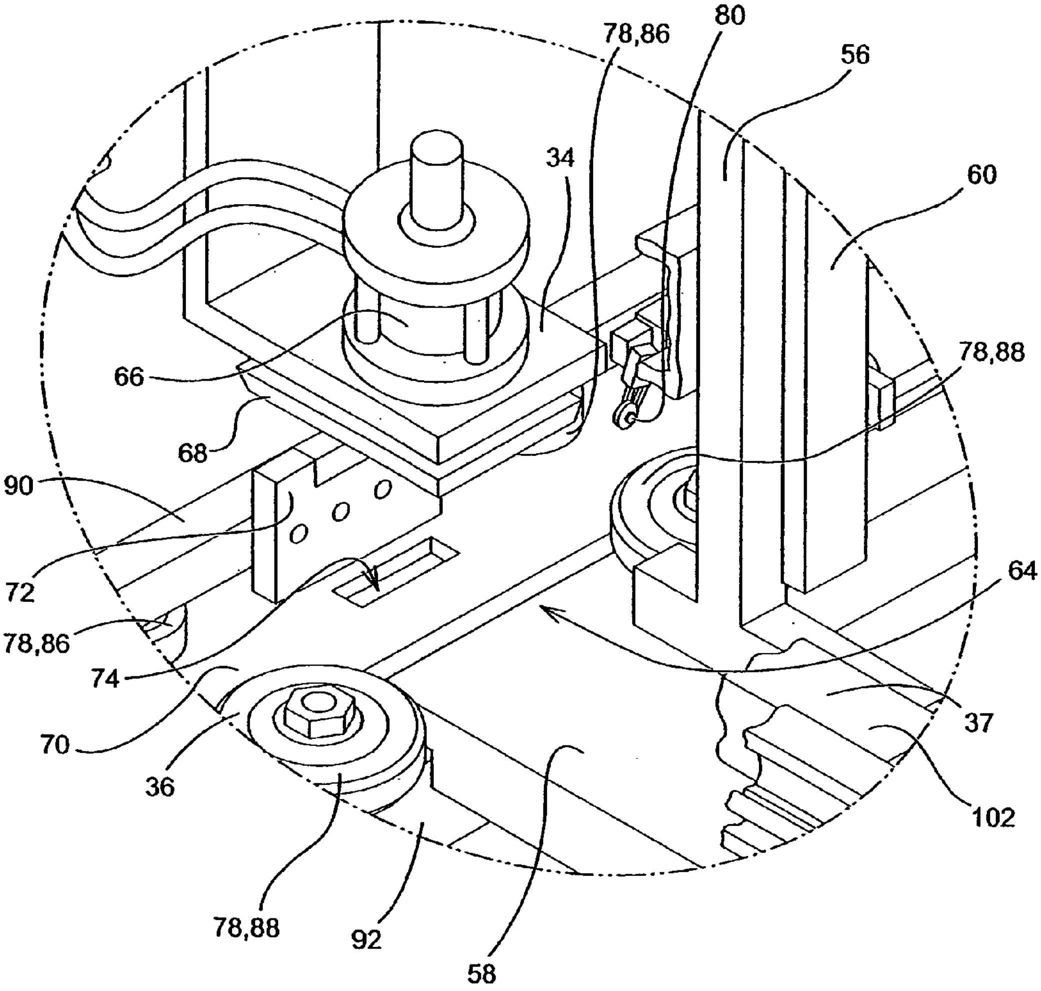
FIG. 4 illustrates a partial detail view of the pallet assembly device of FIG. 2, focusing on the clamping station and the block dispensing station with portions of the block dispensing station removed for clarity.
Figure 5:
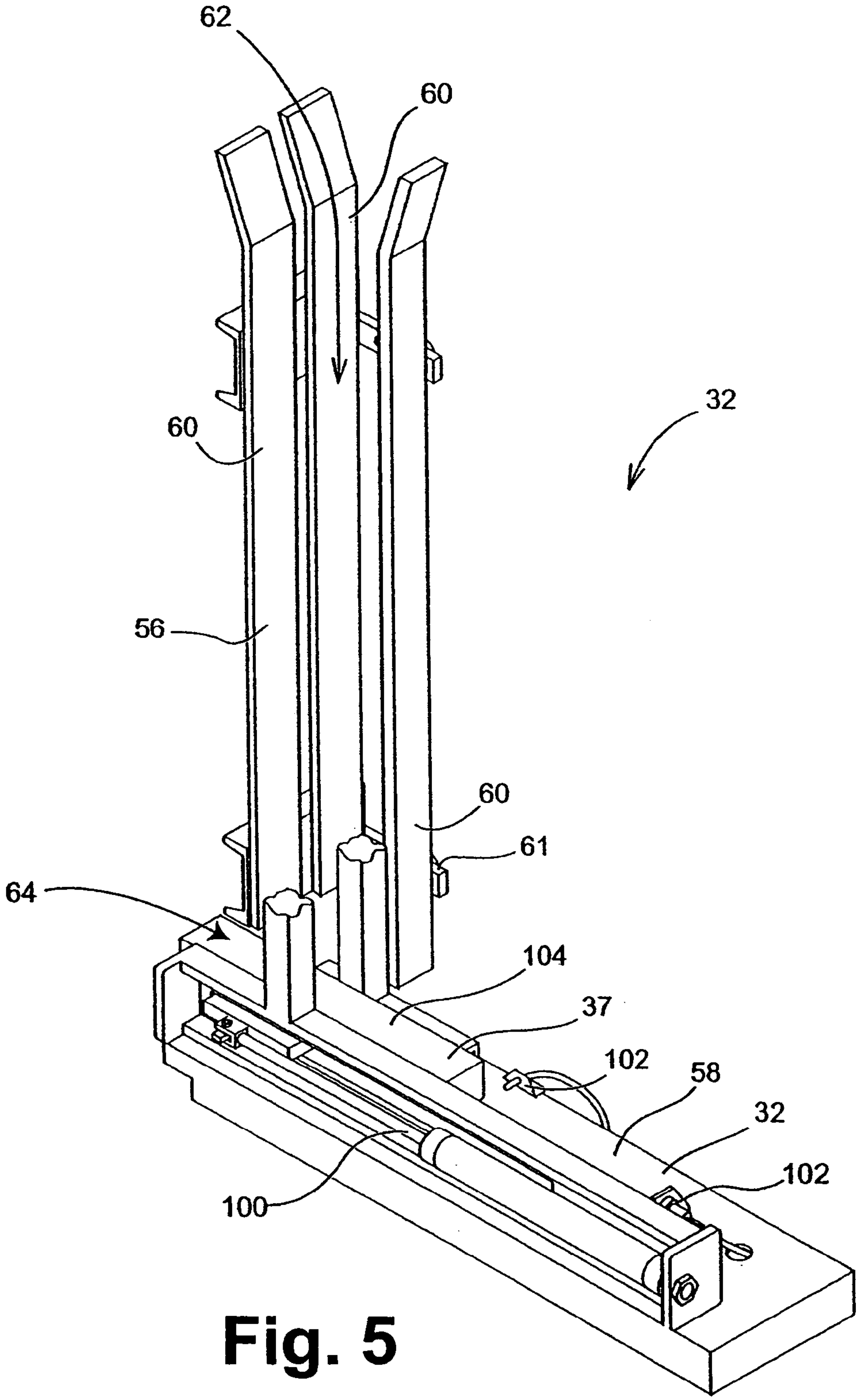
FIG. 5 illustrates a partial detail view of the block dispensing station ct the pallet assembly device of FIG. 2, shown with portions thereof removed for clarity.
Figure 6:
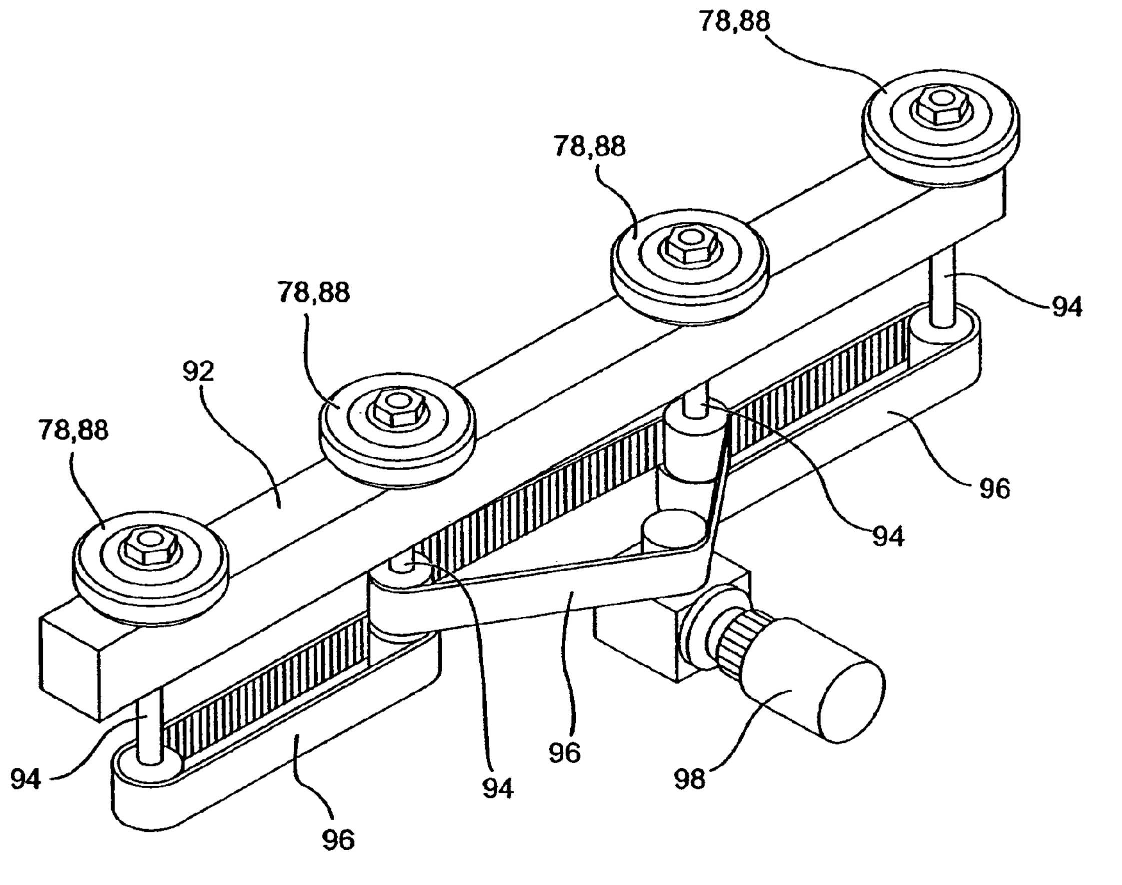
FIG. 6 illustrates a view of the drive wheels assembly of the pallet assembly device of FIG. 2, shown with the block dispensing station removed therefrom for clarity.

The slat conveying mechanism 36 of the block stringer assembly device 28 of the first depicted embodiment includes portions of the slat dispensing station 30 and the clamping station 34. In particular, the horizontal surface 42 of the slat dispensing station 30 and the lower base plate 70 and side plate 72 of the clamping station 34 act as bearing surfaces along which individual slats 24 travel when being conveyed by the slat conveying mechanism 36. The slat conveying mechanism 36 also comprises among other things, a cylinder 76, two parallel rows of guide wheels 78, and a slat position sensor 80. As seen in FIG. 3, the cylinder 76 of the slat conveying mechanism 36 is positioned beneath the horizontal surface 42 of the slat dispensing station 30. The cylinder 76 is connected to a tooth member 82 that extends upwardly through the elongated slot 54 of the horizontal surface 42 and slightly into the slot 44 of the receiving bin 38 and is configured to selectively move the tooth member back and forth horizontally along the elongated slot. This assembly is an individual slat driver. One or more sensors 84 may also be provided to identify when the tooth member reaches limit positions relative to the elongated slot 54, so as to prevent damage to the components of the pallet assembly device 28 and to reverse the direction of the cylinder's 76 operation.

The wheels 78 of the slat conveying mechanism 36 form a row of idler wheels 36 and a row of drive wheels 88. The row of idler wheels 86 is parallel to the row of drive wheels 88 and the rows are positioned horizontally spaced apart from each other immediately above the lower base plate 70 of the clamping station 34, on opposite sides of the fastener slot 74. The idler wheels 86 are each suspended from a first beam 90 and are configured to freely rotate about separate vertical axes. The drive wheels 38 are mounted above a second beam 92 and a configured to rotate with separate vertical axles that are link together to rotate in unison via a plurality of drive belts 96. The drive belts 96 are linked to an electric motor 98. The slat position sensor 80 is positioned between the idler wheels 86 and the drive wheels 88 immediately above the lower base plate 70 of the clamping station 34 where it will detect a slat 24 passing over the lower base plate. This assembly is another slat driver. In the depicted embodiment, it is assembled to operatively cooperate with the previous slat driver.

The block conveying mechanism 37 of the pallet assembly device 28 of the first depicted embodiment comprises another cylinder 100 and a plurality of sensors 102. Like the other depicted cylinders, the cylinder 100 of the block conveying mechanism is pneumatic. The piston is connected to the block dispensing station 32 and is configured and adapted to move a pushing ram 104 horizontally back and forth over the block holder surface 58. As the pushing ram 104 moves in response to the piston 100, the pushing ram 104 passes back and forth beneath the bar members 60 of the block holder through the opening 64 at the base thereof. The sensors 102 are mounted where they can identify the position of the pushing ram 104, so as to limit the travel of the cylinder 100, thereby preventing damage to the pallet assembly device 28 by stopping or reversing the direction of the cylinder's operation.

In addition to the components discussed above, the block stringer assembly device 28 also comprises various elements such as a base frame 106 formed of welded square tubing and an electronic control unit (not shown) for controlling the operation of the various above-mentioned components. The base frame 106 supports and physically connects the various stations of the pallet assembly device 28 and comprises several adjustment clamps 108. The base frame 106 generally holds the slat dispensing station 30 in a fixed orientation relative to the clamping station 34 and in a manner such that the horizontal surface 42 of the slat dispensing relative to the lower base plate 70 of the clamping station. At least one of the clamps 108 of the base frame 106 is configured to lock the first beam 90 of the slat conveying mechanism 36 in a given position. The block dispensing station 32, the block conveying mechanism 37, and the second beam 92, drive wheels 88, drive belts 96, and electric motor 98 of the slat conveying mechanism 36 are all preferably fixed in position relative to each other as a unit but are also horizontally adjustable relative to the base frame 106. A hand operated crank 110 facilitates such adjustments and the unit can be locked in a particular position via use of the adjustable clamps 108.

The electronic control unit of the pallet assembly device 28 is operatively connected to the slat conveying mechanism 36, the block conveying mechanism 37, and the clamping station 34. The control unit is configured to activate the various cylinders 66, 76, 100, the electric motor 98, and the automatic fastening device in response to signals from the slat position sensor 80.

Prior to operation, the pallet assembly device 28 of the preferred embodiment can first be adjusted to accommodate the specific dimensions of the slats 24 and blocks 26 being used to form the stringers 22 of the particular block-style pallet 20 being assembled. This is done by adjusting the side wall members 40 and the end wall 46 of the receiving bin 38 of the slat dispensing station 30 such that the slats 24 will fit loosely in the slot 44 of the receiving bin with little excess play. By loosening the adjustment clamps 108 of the base frame 106, the distance between first and second beams 90, 92 of the slat conveying mechanism 36 is adjusted such that a slat 24 can pass between the drive wheels 88 and the idler wheels 86 with a slight press fit to ensure that the wheels will be in frictional engagement with the slats. Allowing both the first and second beams 90, 92 of the slat conveying mechanism 36 to be adjusted, allows the fastener slot 74 in the lower base plate 70 of the clamping station 34 to remain positioned centrally between the drive wheels 88 and the idler wheels 86, as is desirable. Once in place, the adjustment clamps 108 are tightened to secure the first and second beams 90, 92 in place. The bar members 60 of the block holder member 55 of the block dispensing station 32 can also be adjusted if needed via the adjustment knobs 61 such that blocks 26 of a particular size will fit loosely in the slot 44 of the block holder member 56 with little excess play.

In operation, a plurality of slats 24 are either manually or automatically loaded into the receiving bin 38 of the block dispensing station 32 in a stacked manner. The roller pin 52 of the block dispensing station 32 can assist a person in inserting the first few slats 24 longitudinally into the receiving bin 38. In a similar manner a plurality of blocks 26 are either manually or automatically loaded into the slot 62 of the block holder member 56 of the block dispensing station 32.

When activated, the control unit of the pallet assembly device 28 of the preferred embodiment begins the process of automatically assembling a stringer 22 by activating the cylinder 76 of the block conveyor mechanism 37. When activated, the piston 76 retracts and causes the tooth member 82 to move along the elongated slot 54 of the horizontal surface 42 in a direction toward the clamping station 34. As this occurs, the tooth member 82 engages a longitudinal end of the lower most slat 24 of the stack of slats positioned in the slot 44 of the receiving bin 38 and forces the slat toward the clamping station 34 along the horizontal surface of the slat dispensing station 30. The size of the opening 48 beneath the end wall 46 of the receiving bin 38 prevents the remaining slats from moving with the lower most slat and retains such slats in the receiving bin.

The control unit also triggers the electric motor 98 of the slat conveying or driving mechanism 36 to cause the drive wheels 88 to begin rotating via the drive belts 96. This preferably occurs simultaneously with activation of the cylinder 76, or shortly thereafter. As the slat 24 being moved by the cylinder 76 progresses toward the clamping station 34, it eventually engages between the idler wheels 86 and the driving wheels 88 of the slat conveying mechanism 36. When this occurs, movement of the slat 24 is taken over by the rotation of the drive wheels 88 and the drive wheels 88 then continue to move the slat along the lower base plate 70 of the clamping station 34. As the slat 24 continues to move, it eventually triggers the slat position sensor 80 that, in response, sends a signal to the control unit.

Having received the signal that a slat 24 has reached the position of the slat position sensor 80, it should be understood and appreciated that the control unit can be configured to move the slat to any number of selectable positions along the lower base plate 70 of the clamping station 34 by controlling the starting and stopping of the driving wheels 88 via control of the electric motor 98, with additional sensors. In other words, the control unit sees that the first block has been attached and has moved to the next switch that can be positioned back and forth to determine the placement of the second block. Another switch is tripped to determine the placement of the third block which is also adjustable. In this manner, the slat 24 is moved to and stopped at a first selected position, as shown in FIG. 7, wherein the longitudinal end of the slat farthest from the slat dispensing station 30 is positioned directly beneath the upper horizontal plate 68 of the clamping station 34.

With the slat 24 stopped in the first position, the control unit triggers the cylinder 100 of the block conveying mechanism 37 to cause the pushing ram 104 to move toward the clamping station 34. As this occurs, the pushing ram 104 engages the lower most block 26 stored in the block holder member 56 and forces it through the opening 64 of the block holder member toward the slat 24. The block holder surface 58 of the block dispensing station 32 is positioned above the lower base plate 70 of the clamping station 34 by a distance slightly greater than the thickness of the slat 24. Thus, as the block 26 is translated via the pushing ram 104 of the block conveying system 37, the block slides over the slat 24 and drops thereon. The pushing ram 104 continues to push the block 26 until it engages against the side plate 72 of the clamping station 34. The side plate 72 is positioned such that it is aligned with the perimeters of the idler wheels 86 and therefore acts as a guide rail that is flush with an edge of the slat. Thus, as the pushing ram 104 biases the block 26 against the side plate 72 of the clamping station 34, at least one side of the block is automatically aligned and abutted with a widthwise edge of the slat 24 at a preconfigured location on the slat. Simultaneously, the control unit activates the cylinder 66 of the clamping station 34 to force the upper horizontal plate 68 downward against the block 26.

Figure 7:
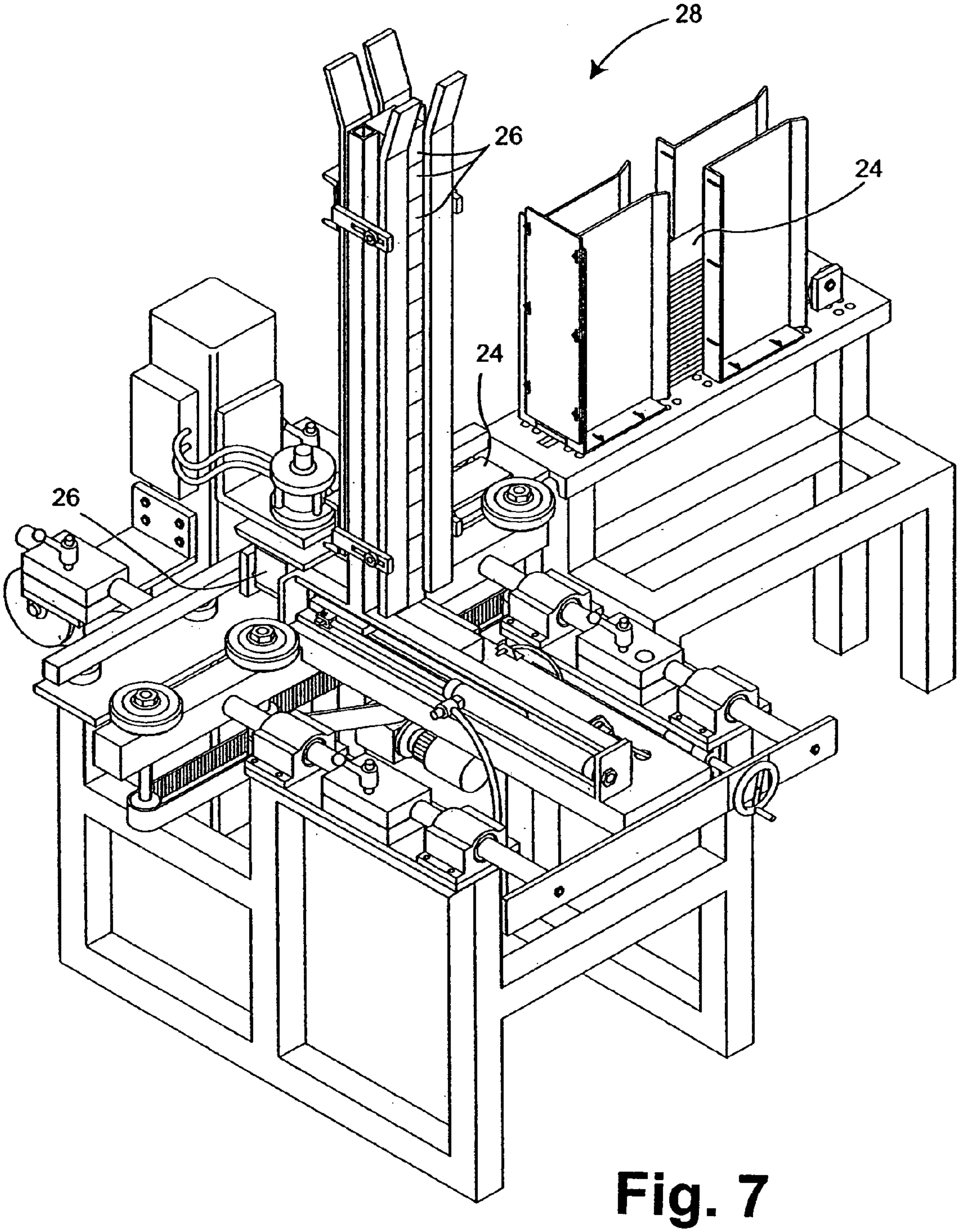
FIG. 7 is a view similar to FIG. 2, showing a slat in a first position with a block clamped thereto.

With the upper horizontal plate 68 of the clamping station 34 biasing the block 26 downward against the slat 24 and the pushing ram 104 biasing the block horizontally against the side plate 72 of the clamping station 34 to maintain the block in its preconfigured location as shown in FIG. 7, the control unit activates the automatic fastening device to force a fastener upwardly through the fastener slot 74 of the lower base plate 70 of the clamping station and into the slat and block. The fastener secures the block 26 and slat 24 together and, thereafter, the control unit then activates the cylinders 66,100 to unclamp the block 26 and slat 24 by raising the upper horizontal plate 68 of the clamping station 34 and moving the pushing ram 104 away from the side plate 72. As the pushing ram 104 returns to its original position, it passes out from under the block holder member 56 and allows the remaining blocks being held by the block holder member to drop down onto the block holder surface 58.

Figure 8:
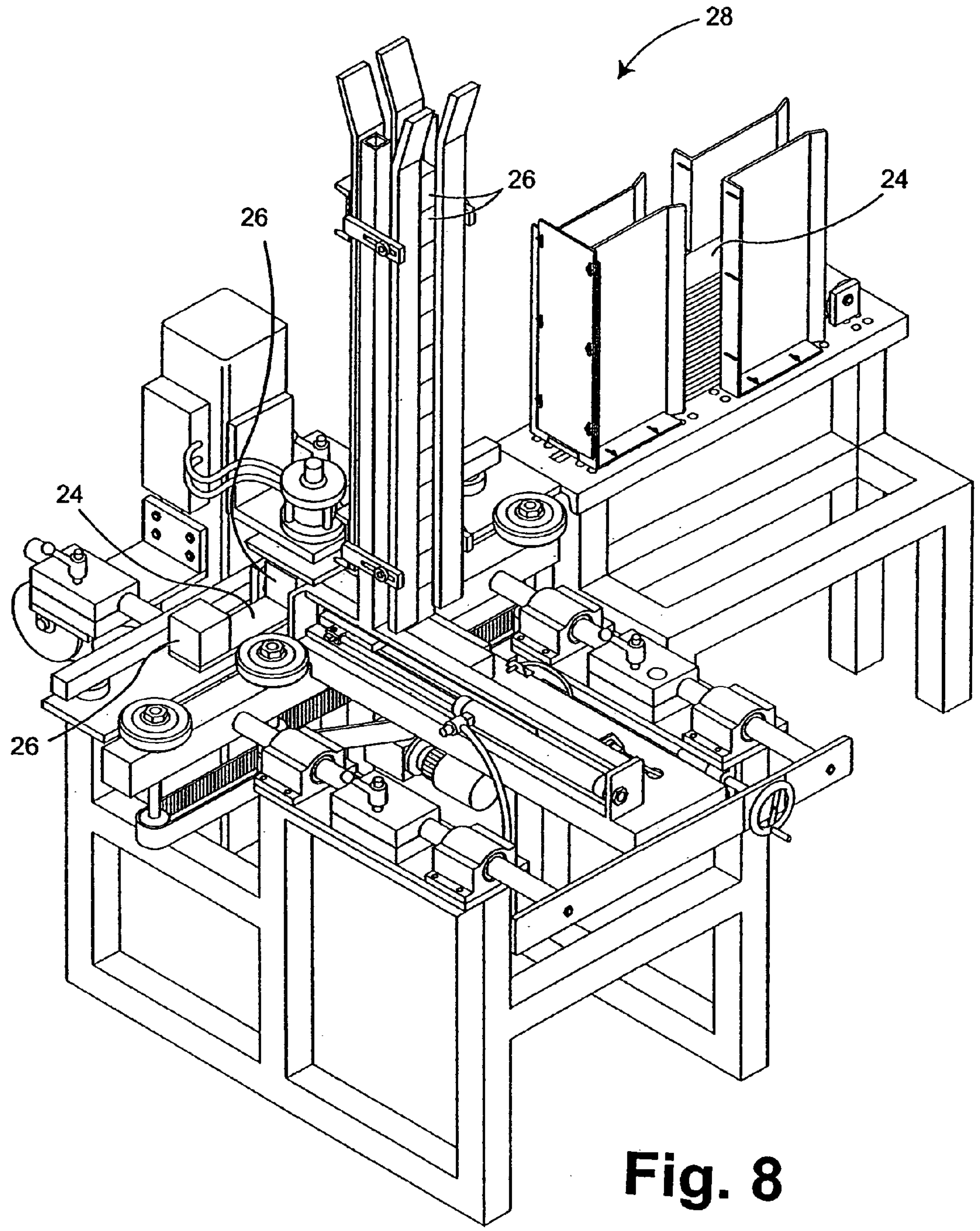
FIG. 8 is a view similar to FIG. 2, showing the slat of FIG. 2 in a second position with the first block attached thereto and with a second block clamped thereto.
Figure 9:
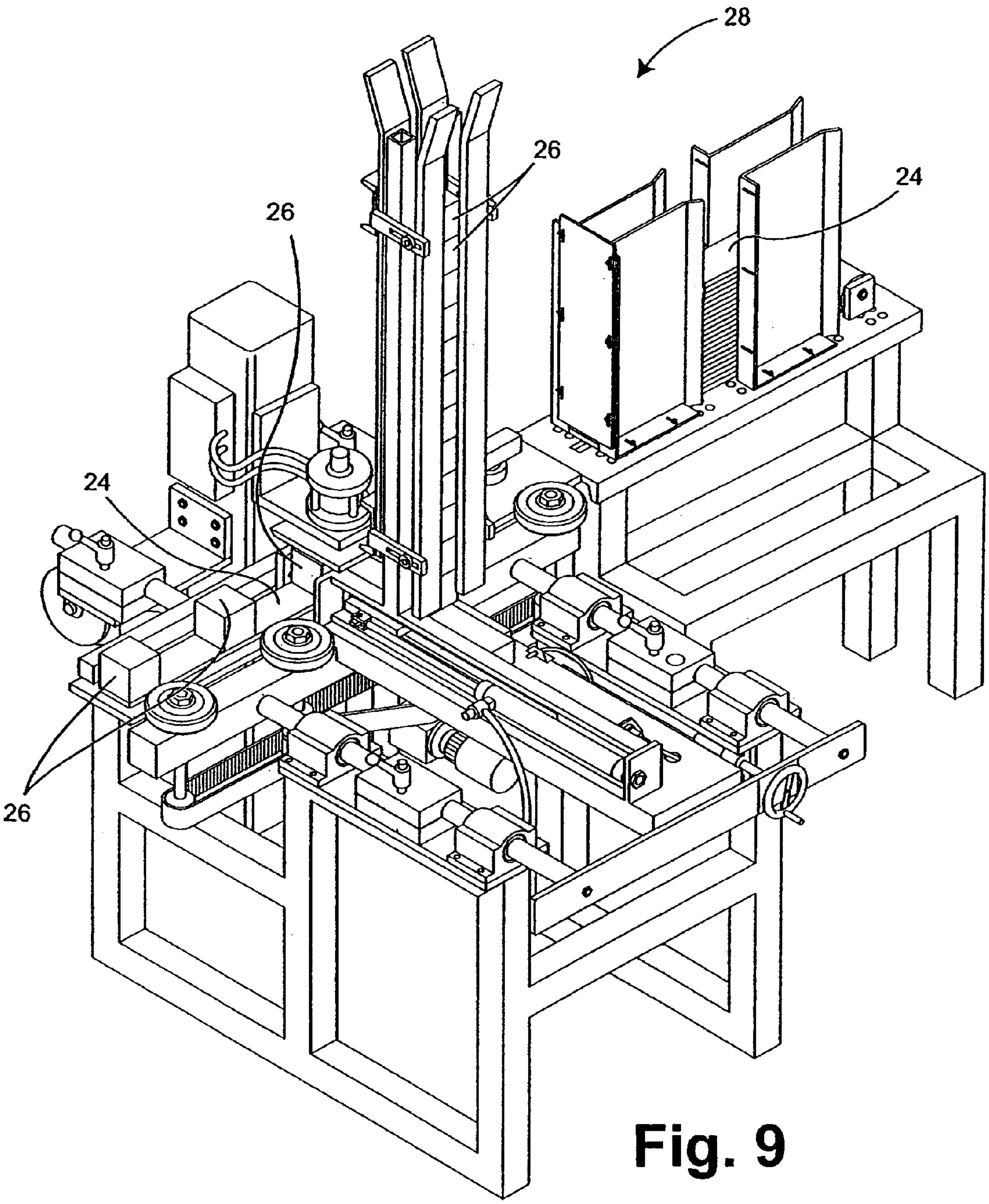
FIG. 9 is a view similar to FIG. 2, showing the slat of FIGS. 7 and 8 in a third position with the first and second blocks attached thereto and with a third block clamped thereto.
Figure 10:
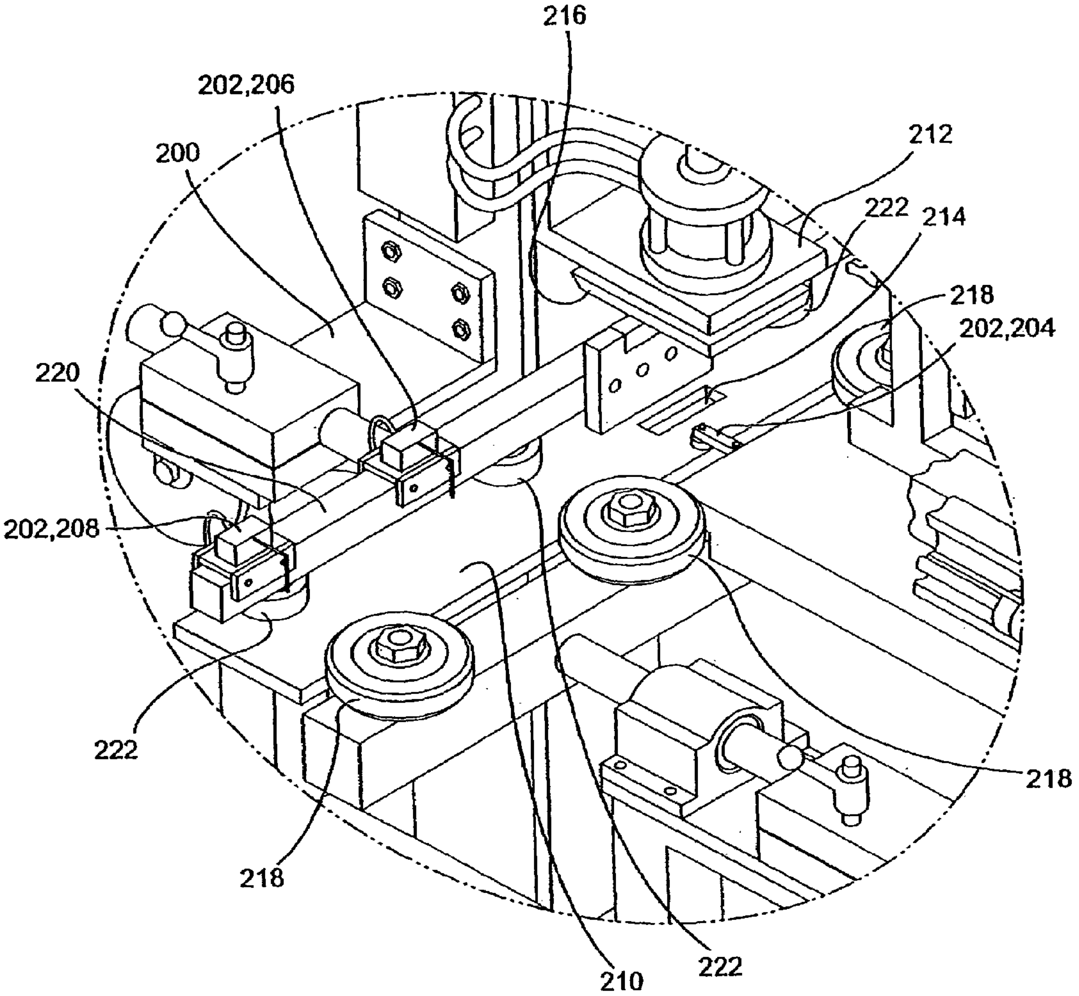
FIG. 10 is a schematic perspective view of another embodiment of the block/slat attacher.

With the first block 26 attached to the slat 24, the control unit then activates the electric motor 98 to advance and stop the slat 24 at a second selected position where the longitudinal center of the slat is beneath the upper horizontal plate 68 of the clamping station 34. With the slat 24 stopped in the second position, the procedures described above are automatically repeated to secure a second block 26 to the slat in a second preconfigured location on the slat, as shown in FIG. 8. Afterwards, the control unit then again activates the electric motor 98 to advance and stop the slat 24 at a third position where the longitudinal end of the slat nearest the slat dispensing station 30 is beneath the upper horizontal plate 68 of the clamping station 34. Once more, the procedures described above are automatically repeated to secure a third block 26 to the slat 24, as shown in FIG. 9.

With the above-described steps performed, the formation of a stringer 22 is complete and the control unit once again activates the electric motor 98 to advance the stringer off of the lower base plate 70 of the clamping station 34. The control unit also simultaneously activates the cylinder 76 of the slat conveying system to return the tooth member 82 to its original position so that the entire procedure can be repeated automatically to form additional stringers 22.

From the above-description, it should be clear that an operator of the pallet assembly device 28 of the preferred embodiment needs only to stack additional slats 24 in the receiving bin 38 of the slat dispensing station 30 and additional blocks 26 in the block holder member 56 block dispensing station 32 to continuously produce block-style pallet stringers 22.

A second embodiment of the block attacher, 310, depicted in FIGS. 11–21, is built around an assembly deck 312 having an assembly station 314, a separate stapling station 316 and an ejection station 318.

The components of the block/slat stringer assemblies to be produced include the slats and a variety of differently dimensioned blocks. Generally two different size blocks are used, long blocks and short blocks. The slats are dispensed from dispenser 320.

Slat dispenser 320 is comprised of a magazine 322A and 322B and a first dispensing actuator 324 and a second dispensing actuator 326. In the depicted embodiment, these actuators are pneumatically driven. Alternative designs considered to be within the scope of the present invention may be driven hydraulically, by solenoids, mechanically or otherwise. A stack of slats is placed in the magazine manually. The first dispensing actuator 324 drives a thin plate that is horizontally oriented and narrower in its vertical dimension than the slats. When actuated, this thin plate (not shown) pushes the bottom slat in the magazine retrograde to the direction of its assembly travel, which is to the right in FIG. 11. The magazine has two floor components (not shown) beneath which is a gap 328 tall enough to allow one board to pass but not two. Actuation of the first dispensing actuator pushes the thin plate to the right in FIG. 11, causing the lead end of the bottom slat to drop off of the partial floor of the magazine. The trailing end of the bottom slat remains supported by the other partial floor of the magazine under magazine component 322B. After the first dispensing actuator has fired, the second dispensing actuator 326 extends another thin plate (not shown) to push the trailing end of the slat off the partial floor in magazine component 322B so that the entire slat falls onto the deck 312, and, more particularly, onto vertical chain 330. Accordingly, individual slats are dispensed so that individual stringers will be assembled.

An individual slat driver includes a vertical chain 330 that is maintained and driven by vertical chain pulley 332. The vertical chain 330 includes spaced fixtures dimensioned to engage the trailing end of a dispensed slat and push it along the deck 312 in the direction of assembly travel. These fixtures are spaced far enough apart to receive one slat between each fixture as the vertical chain rotates. In the depicted embodiment, each vertical chain fixture is 65 inches apart. The standard height of pallet slats is ½ inch and accordingly the fixtures in the depicted embodiment would be less than one half of one inch so as to avoid contact with the slat magazine 322 or a next slat in it.

The vertical chain 330 delivers the next slat to the block assembly portion of deck 312. First the slat is picked up by a horizontal chain 340. The horizontal chain 340 is another individual slat driver that is driven by drive pulley 342. At the slat receiving end of the horizontal chain is guided by pulley 344. Horizontal chain 340 also has fixtures. Fixture 346 receives and pushes a next slat through the assembly stages 314, 316 and 318. Slat pushing fixture 346 is in a set accompanied by fixtures 348A, 348B and 348C. Fixtures 346 and 348 are positioning fixtures that are in preconfigured spaced relations to one another. Positioning fixtures 348, like positioning fixture 346, each have a vertical component. Fixture 346 has a vertical component that extends downwardly a sufficient dimension to engage and push the half inch tall slat. However, fixtures 348 do not extend as far down as fixture 346. They are separative from the surface of deck 312 by at least one half inch. Accordingly, when the horizontal chain 340 receives the next slat from where it has been deposited by the end of vertical chain 330, that is at or near pulley 344, the three fixtures 348 will pass over the slat without engaging it. Finally, as horizontal chain 340 continues rotation, fixture 346 will be brought around as the fourth fixture in the fixture group and, being wider than fixture 348, will engage the end of the next slat and push it on towards assembly station 314.

The block assembly apparatus of the present invention is controlled by a microprocessor. A microprocessor controls a motor 350 which motor drives horizontal chain 340 and through gear box 352, also vertical chain 330. Accordingly, motor 350 can be stopped at selectable positions in order that the entire assembly process along deck 312 stops progress of the slats in the selected assembly positions 314, 316 and 318 for various process steps. At least some of these preselected positions align block dispensers and position fixtures such that dispensed blocks are abutted and aligned at proper preconfigured locations on the slats. The controlling microprocessor will be more fully described below.

Assembly station 314 is where the chain makes the first stop in a first selected position. The first position aligns the first fixture 348A across from the long block insertion device 360. In the depicted embodiment, long block dispenser or insertion device 360 is comprised of a push rod 362 and a push rod actuator 364. In the depicted embodiment, push rod actuator 364 is pneumatic. It is within the scope of the present invention that mechanical, hydraulic, solenoids or other means may be used to actuate push rod 362. Push rod 362 is aligned with long block insertion ramp 365. A next long block is pushed by push rod 362 across long block insertion ramp 365 and also across deck 312, into its proper position abutting fixture 348A. A next long block for later use will be biased into a ready position on a long block installation ramp 365 from long block magazine 366. Long block magazine 366 conveys long blocks into the ready position via chain 368. In the depicted embodiment, horizontal chain drive for block magazines is used. It is within the scope of the present invention that inclined gravity feed or vertical or inclined mechanically assisted feed may also be used.

In an analogous manner, a second block dispenser or short block insertion device 370 includes a push rod 372, push rod actuator 374, short block insertion ramp 375, magazine 376 and magazine drive chain 378. Their operation is equivalent to that of the long block insertion assembly 360. However, the short block assembly device 370 installed the short blocks when the slats are at the subsequent selected position, which are not shown in FIG. 11.

Figure 11:
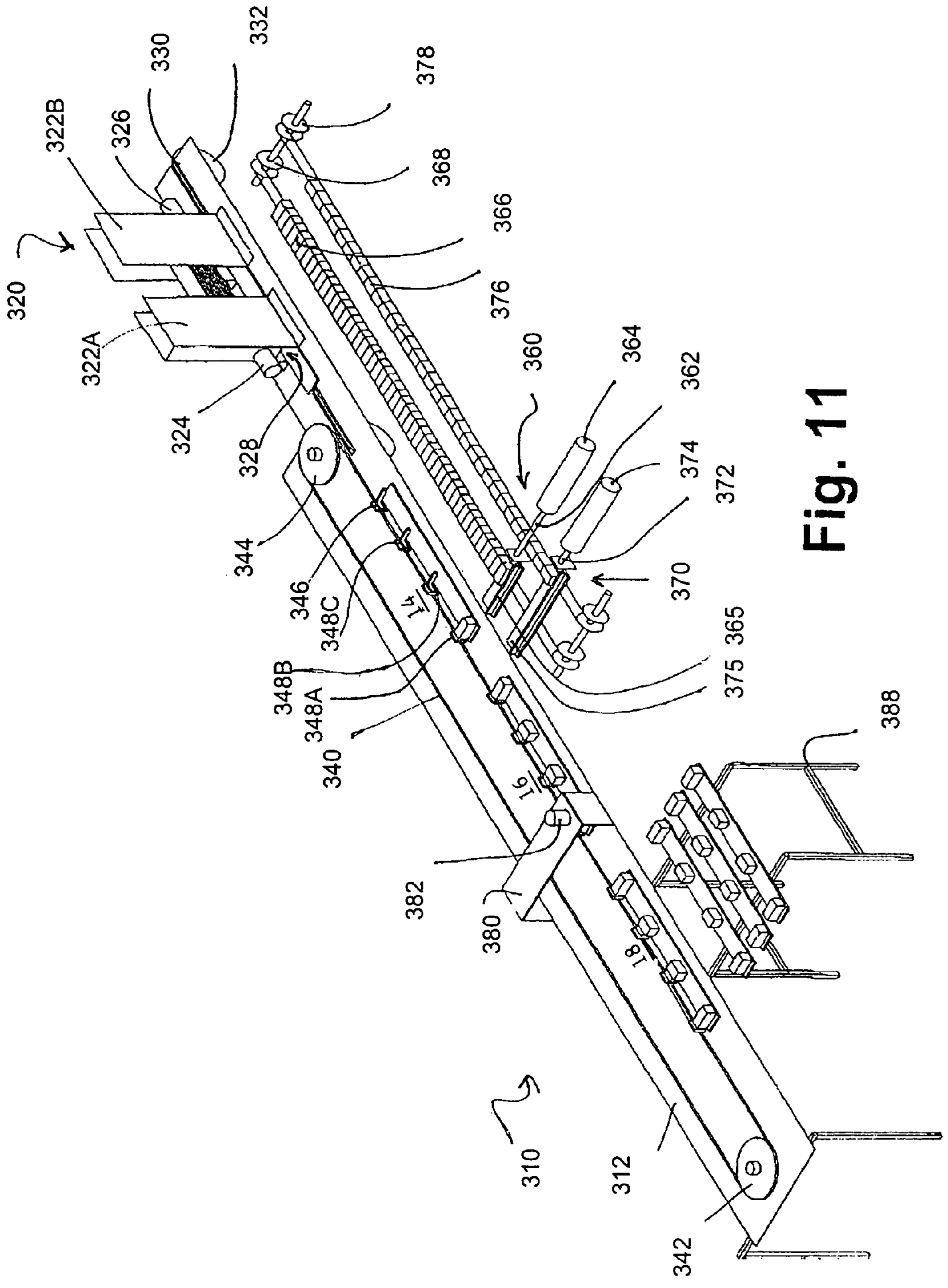
FIG. 11 is a perspective view of another embodiment of the block/slat attacher.
Figure 12:
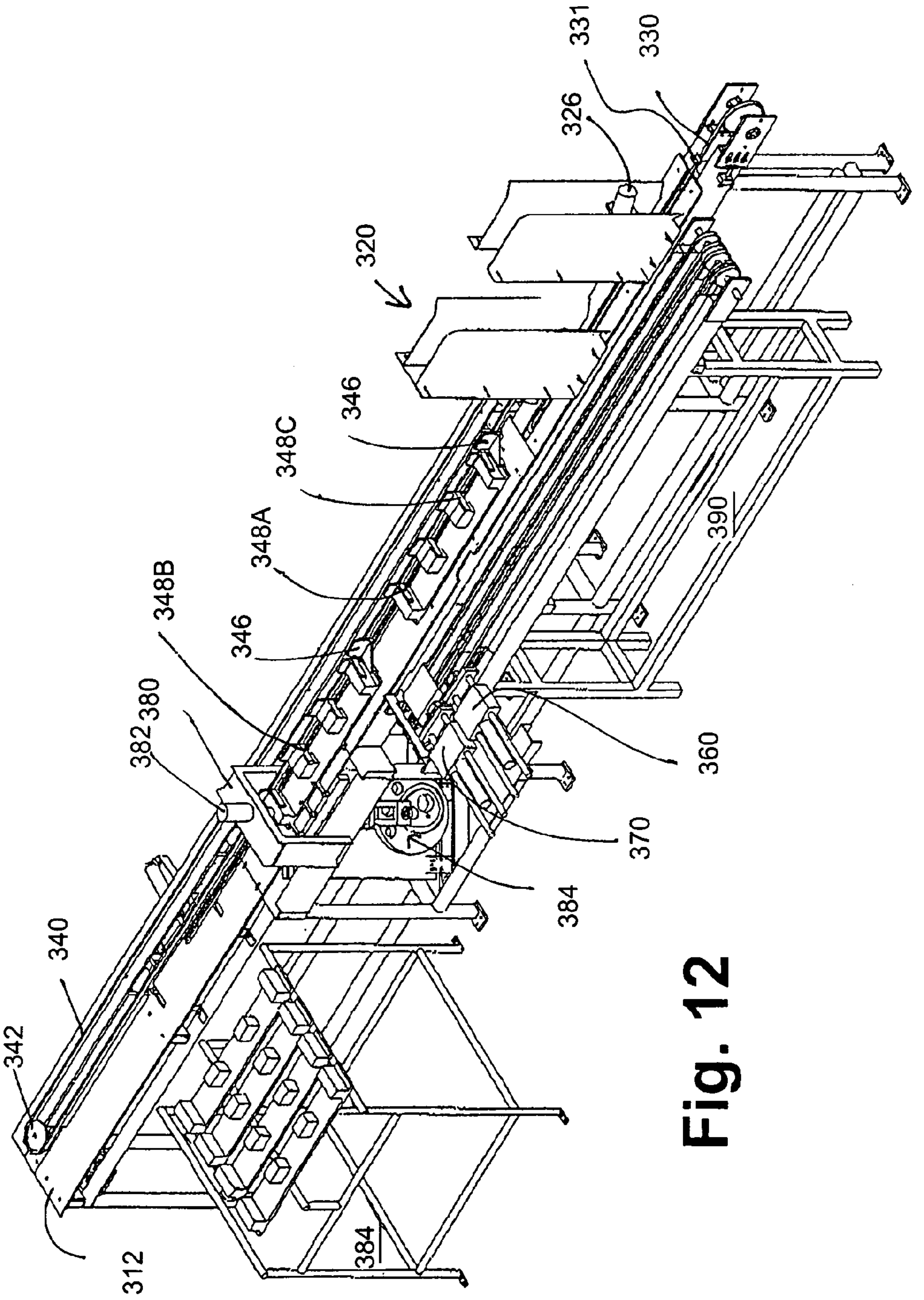
FIG. 12 is a side view of another embodiment of the block/slat attacher.
Figure 13:
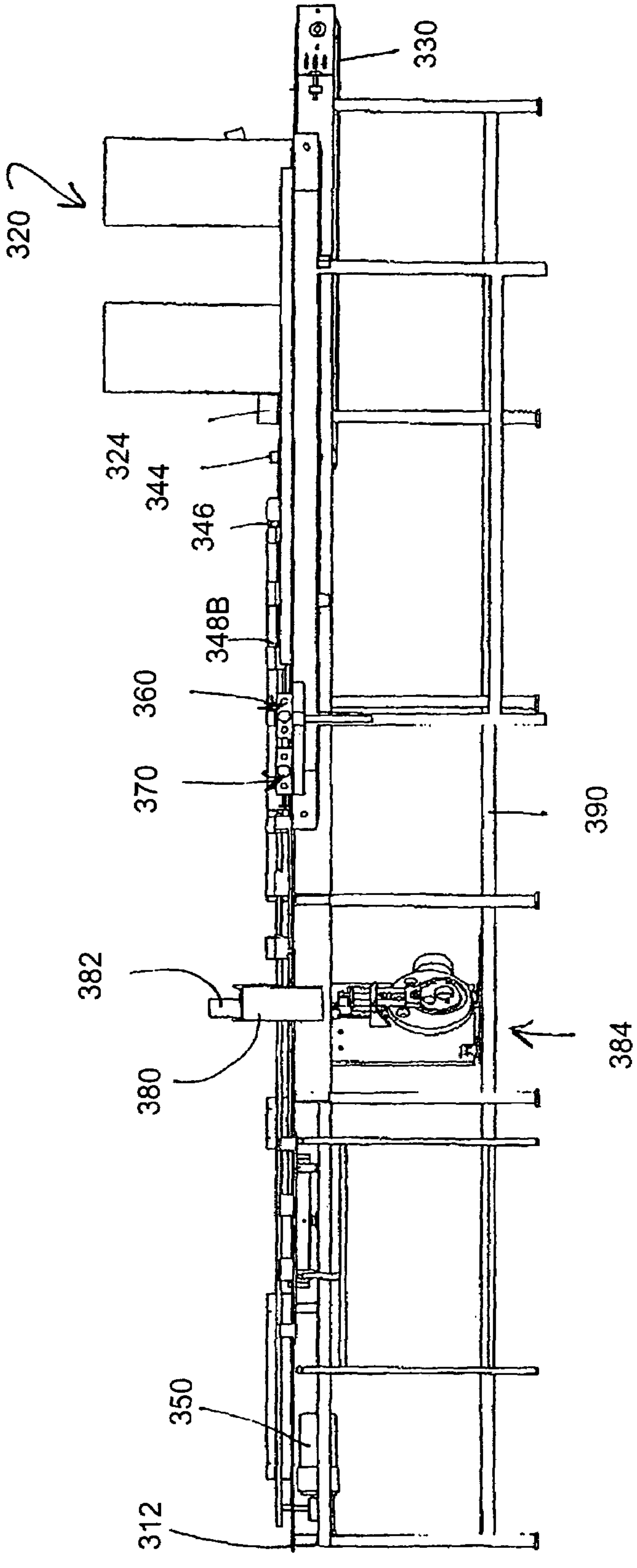
FIG. 13 is a top view of another embodiment of the block/slat attacher.
Figure 14:
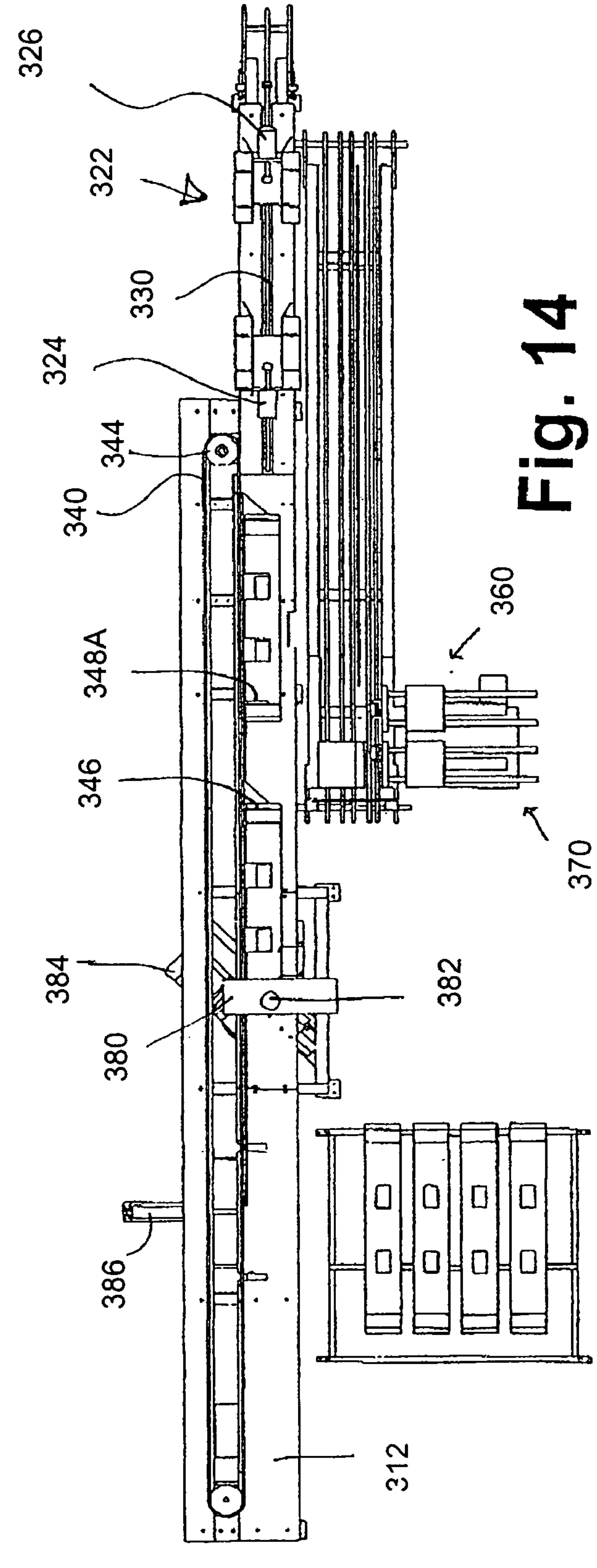
FIG. 14 is a perspective view another embodiment of the block/slat attacher viewed from underneath.
Figure 15:
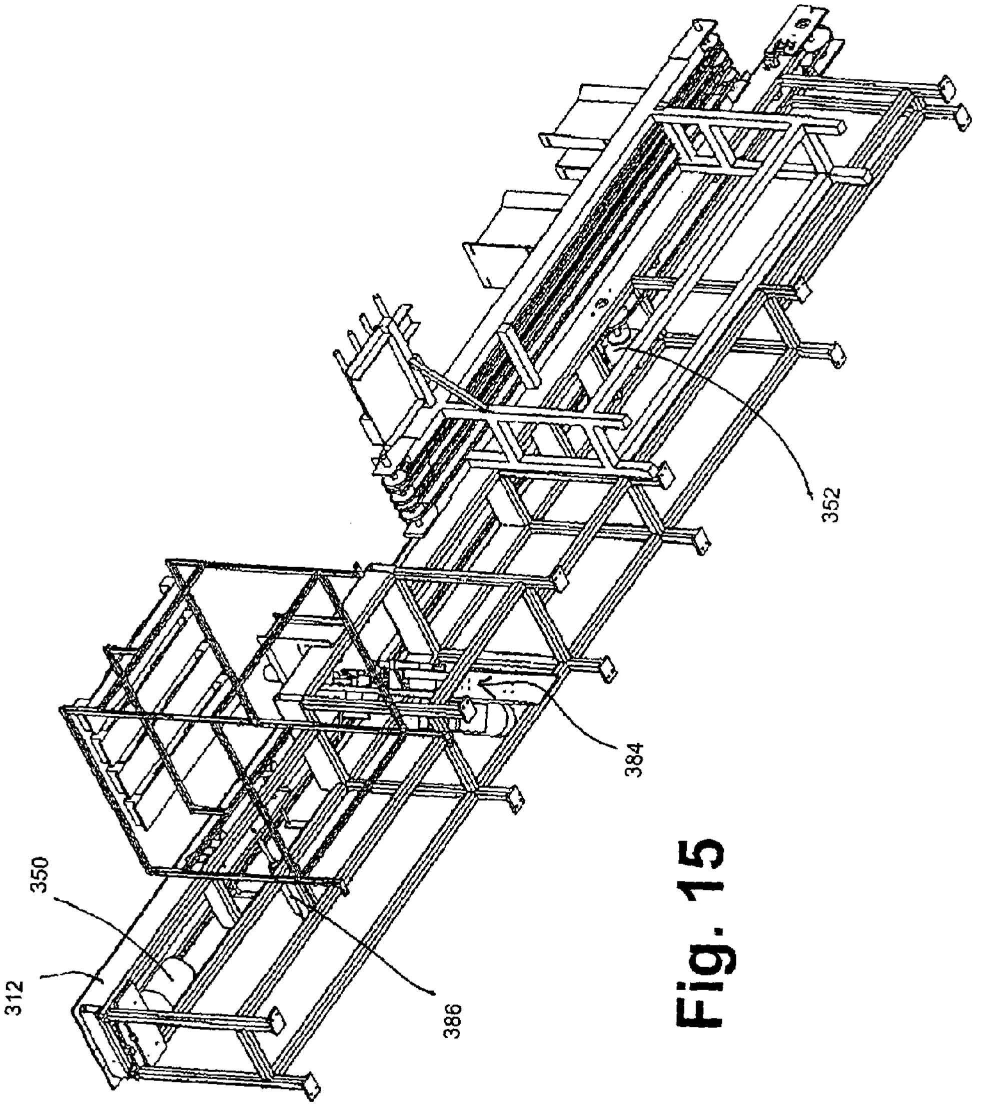
FIG. 15 is an opposite side view of another embodiment of the block/slat attacher.
Figure 16:
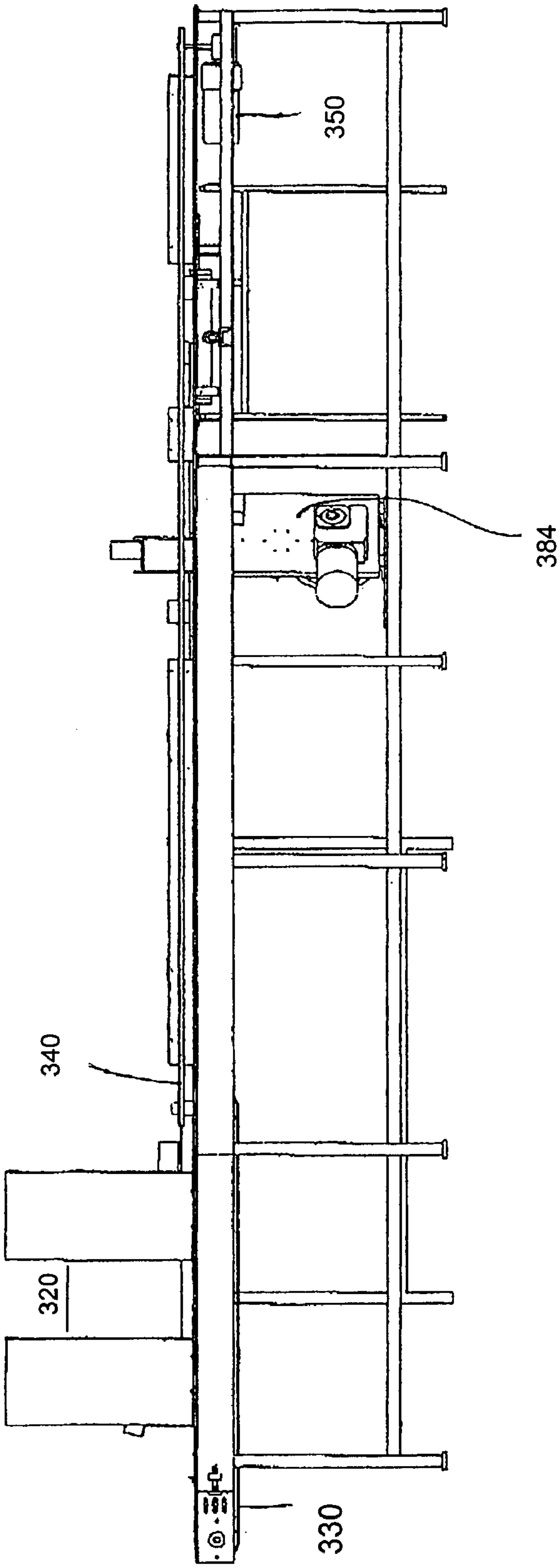
FIG. 16 is an end view of another embodiment of the block/slat attacher.

It should be noted that FIG. 11 is schematic, in the sense of the interaction and assembly configuration of long block insertion device 360 and short block insertion device 370. Although both installation ramps 365 and 375 are on a plane with deck 312, the push rods 362 and 372, and push rod actuators 364 and 374 are staggered or otherwise offset from one another so that the long block installation device push rod 362 does not obstruct or interfere with short block assembly device 370. This may be achieved in a variety of ways, including that depicted and described below.

Fixation station 316 is where the blocks are fastened to the slat. Fastening may be by any means and remain within the scope of the present invention. In the depicted embodiment a bridge 380 serves as a mount for a stapling pressure actuator 382. Like the other actuators in the depicted embodiment, pressure actuator 382 is pneumatic, however, hydraulic, mechanical, or electrical-mechanical devices may be used. The pressure actuator or clamp 382 exerts downward force on the block beneath bridge 380, securing it against the force that will be exerted against it by stapler 384 which is located below deck 312 and staples the slat to the block above it through a hole (not shown) in deck 312. The two short blocks and final long block of each block/slat stringer assembly are also stapled or otherwise fixed together when each block is successfully stopped in a stapling a position under bridge 380.

The final assembly station 318 is simply a position at which the completed block/slat assembly is ejected from deck 312 onto rack 384. Ejection may be automated or manual. Automated ejection may be achieved by any means and remain within the scope of the present invention. Completed blocks are, in the depicted embodiment, removed from rack 384 manually.

Deck 312 and the rest of the components are supported at a convenient working level by frame 390.

Automated pneumatic ejector 386 may best be seen on FIGS. 12, 14, 15 and 17.

Figure 20:
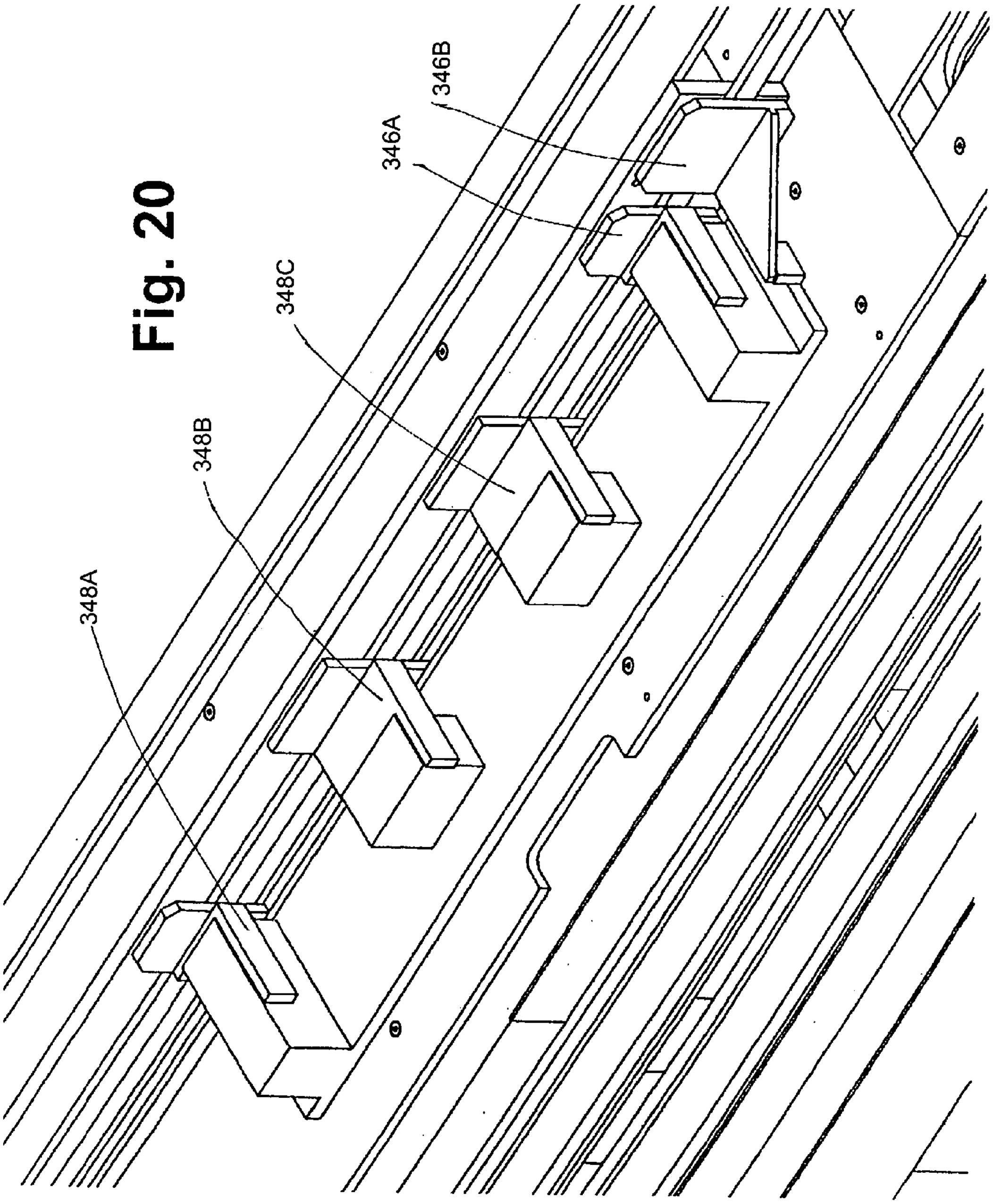
FIG. 20 is a close up of one embodiment showing fixtures used to propel a slat and the properly positioned blocks on the slat.

Slat dimensions have become standardized at five or eight inches wide and ½ inches tall. Length may be 36, 48 or 60 inches. Of course, it is within the scope of the present invention that slat and block dimensions be variable. However, because of the standard sizes typically used in warehouses, the fixtures on the chain are spaced accordingly. On vertical chain 330, fixtures 346 and 348 (as seen in FIG. 20) are spaced every 65 inches apart. On the horizontal chain, when configured to assemble 36 inch long block slat assemblies, each fixture set is separated by 40 inches.

The fixtures are generally fabricated from angle iron such that they may be attached to the horizontal and vertical chains. In the depicted embodiment, ¼ inch chains are used. The fixtures may be manually removed, re-spaced and reattached for a run of a different dimension slat/block assembly.

Position Control

A microprocessor controls starting and stopping of the assembly drive chains 330 and 340 and when stopped also controls the firing of the assembly devices 360 and 370, stapler 384 and finally ejector 386. It is within the scope of the present invention that any type of processor be used. In the depicted embodiment, a PLC is used, in particular a Micrologic 1500.

Motor 350 is engaged with an encoder configured to signal through electrical communication with the processor a certain number of pulses per revolution which may be counted and stored by the processor. The encoder is mechanically connected with the drive chain. In the depicted embodiment it is attached to a drive shaft and/or gear assembly between motor 350 and drive gear 342. Alternatively, it may be attached at point 344 or either of the vertical chain pulleys. The motor is also operatively associated with a pneumatic air clutch so that the application of force to drive chain may be stopped in order to stop chains 340 and 330.

Position Logic

As can be seen in the figures, assembly steps are executed simultaneously at assembly stations 314, 316 and 318. Holding the assembly line at the correction positions and executing next assembly steps simultaneously is executed by the processor. In the depicted embodiment, the controller position logic is as follows.

In a first position, a slat at assembly station 314 is stopped with the leading edge of the slat and fixture 348A across from long block insertion ramp 365. The same first position stop will position at attaching station 316 a first long block of the preceding block/slat assembly. The stringer stops with is first long block just above stapler 384 and below pressure actuator 382. A third stringer will be in ejection station 318.

Once stopped, the long block installation device 360 installs a long block against fixture 348A on slat stopped at assembly station 314. Simultaneously, a first long block is stapled to the slat stopped at assembly station 316. The finished stringer now located at ejection station 318 is ejected by ejector 386.

The assembly stations 314, 316 and 318 and the slats located in them are separated by gaps appropriate to the slat length being assembled. For 36 inch slats, in the depicted embodiment, this gap would be 12 inches. Accordingly, after the first position assembly steps have been executed, the processor next re-engages motor 350 with the drive train and moves the horizontal chain 340 12 inches to a second position where the processor signals a second stop. At this position, a first short block (the second overall block) is stapled onto the slat located at attachment station 316.

Thereafter, the drive train is re-engaged with motor 350 and all slats are advanced another 12 inches. At this third station, the slat located at attachment station 316 has its second short block (the third block overall) stapled onto the slat. At this third position, a first short block (second block overall) for the slat in assembly station 314 is aligned with short block installation ramp 375. Simultaneously with stapling at station 316, the first short block is installed by short block installation device 370 against fixture 348B. These two steps being completed, the drive train is re-engaged at a signal from the processor and the assembly line advances another 12 inches.

At this fourth position, the processor signals the clutch to disengage the motor 350 and the drive train stops again. At this fourth position, the second long block (fourth block overall) is stapled to the slat located in attachment station 316 completing that stringer. In this fourth position, the slat located in block installation station 314 is now aligned such that fixture 348C is positioned to receive a second short block (third block overall) from short block installation ramp 375. Also in this position, long block installation ramp 365 (which is separated from short block installation ramp 375 by 12 inches) is aligned with the final fixture 346. Simultaneously with the installation of the second short block against fixture 348C at this fourth position, the final long block is installed by long block installation device 360 against fixture 346.

The controller re-engages the motor to the drive train and the assembly line is moved another 12 inches. This returns the assembly line to the first position. The block/slat assembly that had been at block installation station 314 is now located with its first block over stapler 384 at attachment station 316.

The advantage of a horizontal block magazine is that more blocks may be manually installed thereon during operation. Vertical gravity feed magazine cannot be refilled quickly enough by an operator since it will not be tall enough to hold enough blocks. The depicted block attacher has a throughput capacity up to 500 stringers assembled per hour.

Figure 21:
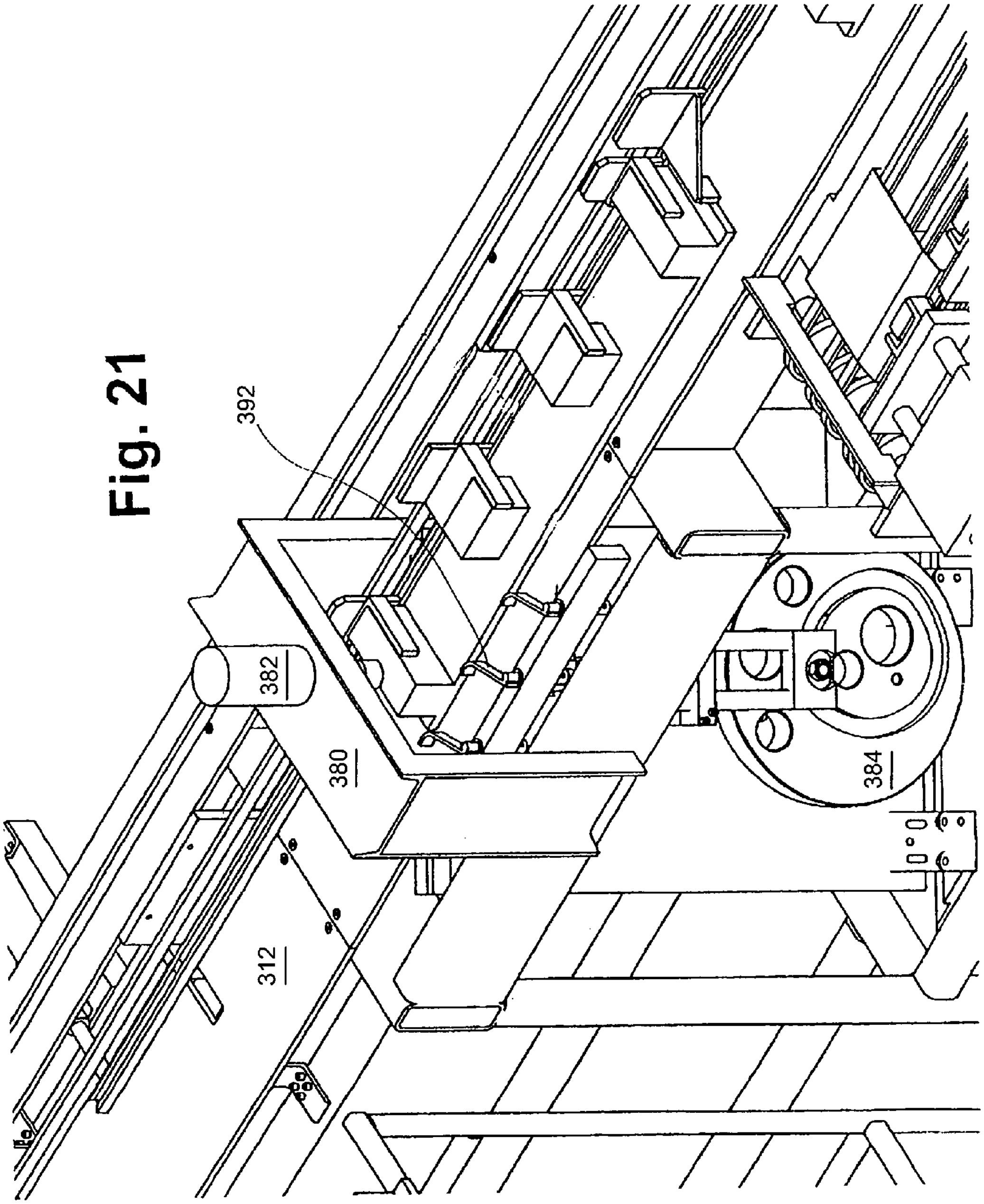
FIG. 21 is a close up showing the biasing springs of the present invention.

Not shown in the FIGS. 11–18, for clarity purposes, is a series of biasing springs 392 associated with each fixture on the horizontal chain. These biasing springs 392 are depicted in FIG. 21. They are oriented at a 45 degree angle to push newly received blocks, long or short, against each fixture such that the block is held against he horizontal chain 340 and back against the fixture.

Occasionally, a warehouseman will order block/slat assemblies with the blocks variably spaced. This can be achieved with the block attacher of the present invention in multiple ways. The position fixtures may be manually reattached elsewhere on the horizontal chain 340.

Block Installation

Figure 17:
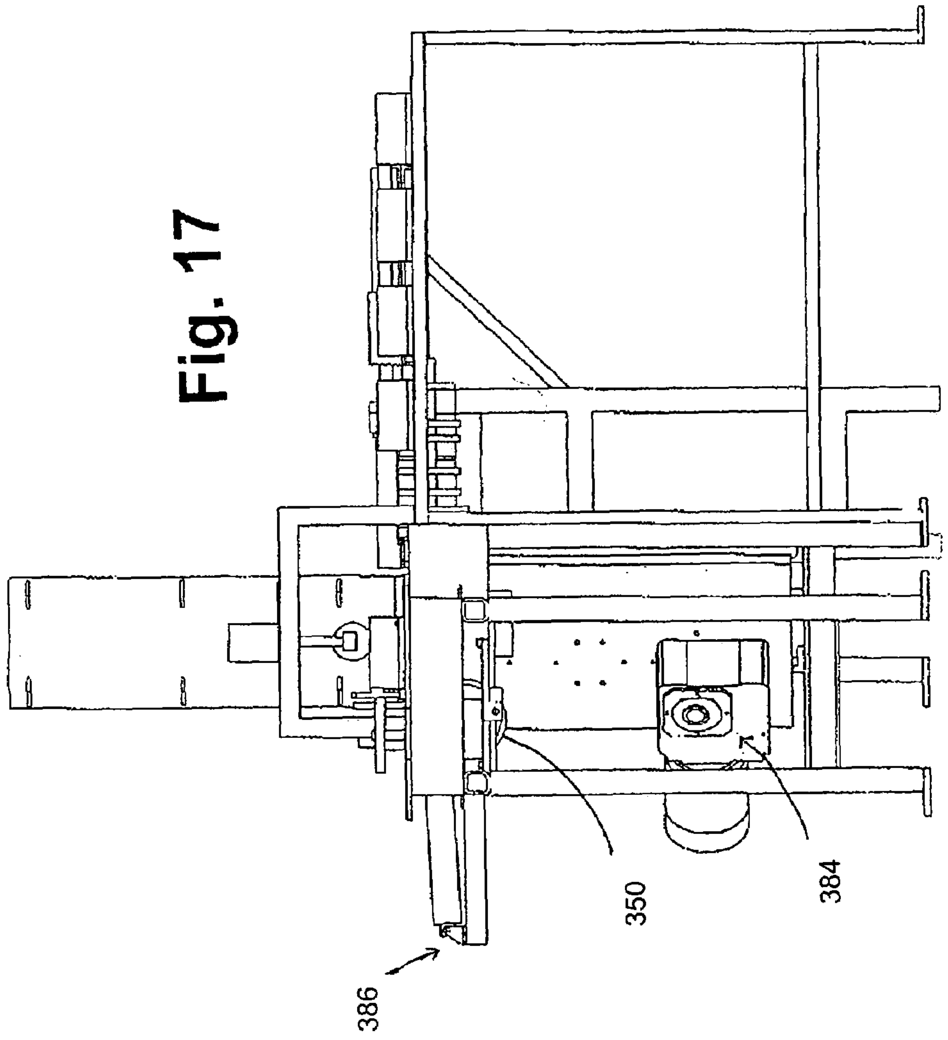
FIG. 17 is a perspective view of the block magazines and block installer of the present invention.
Figure 18:
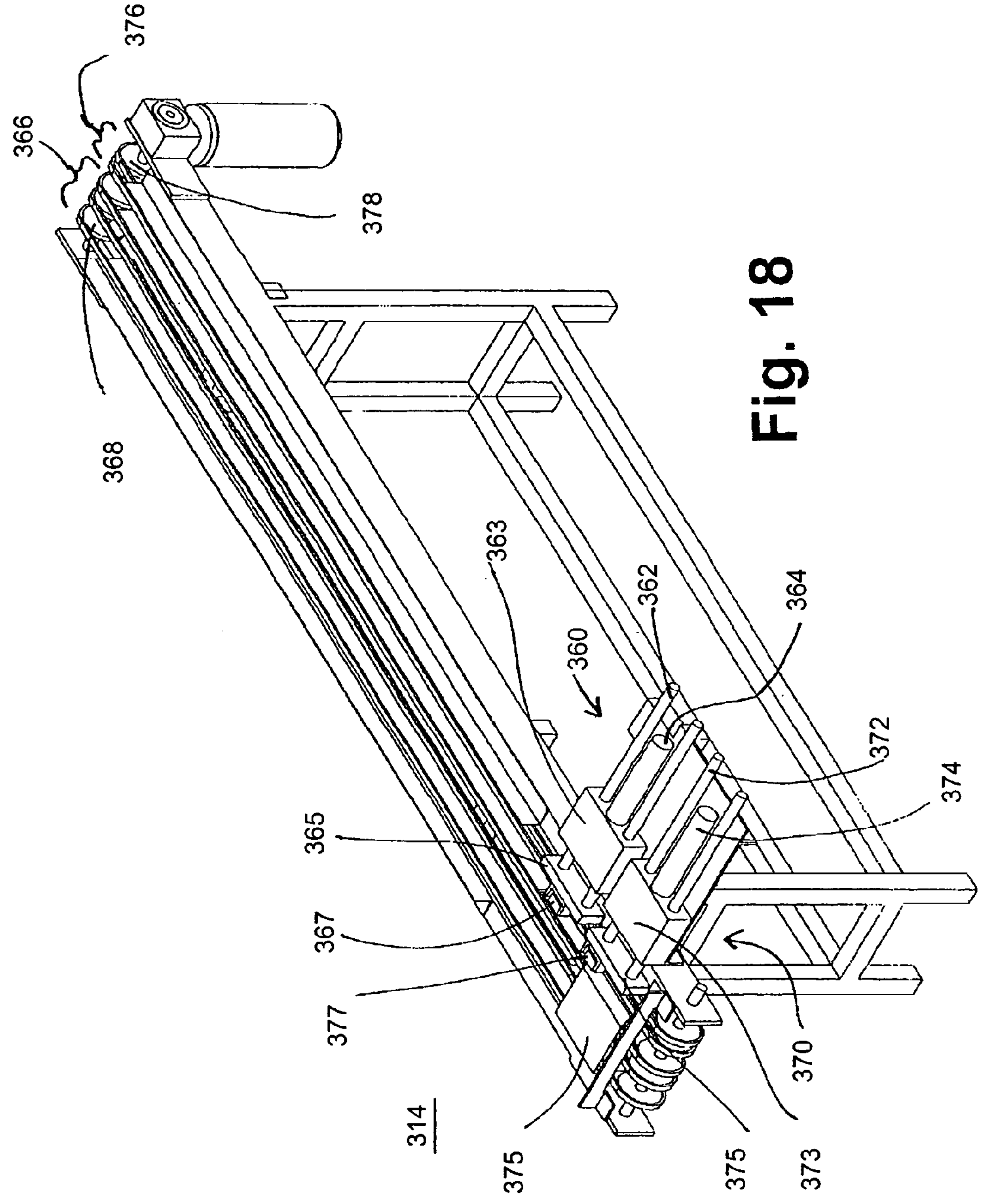
FIG. 18 is another perspective view of the block magazine and the block installers of the present invention.
Figure 19:
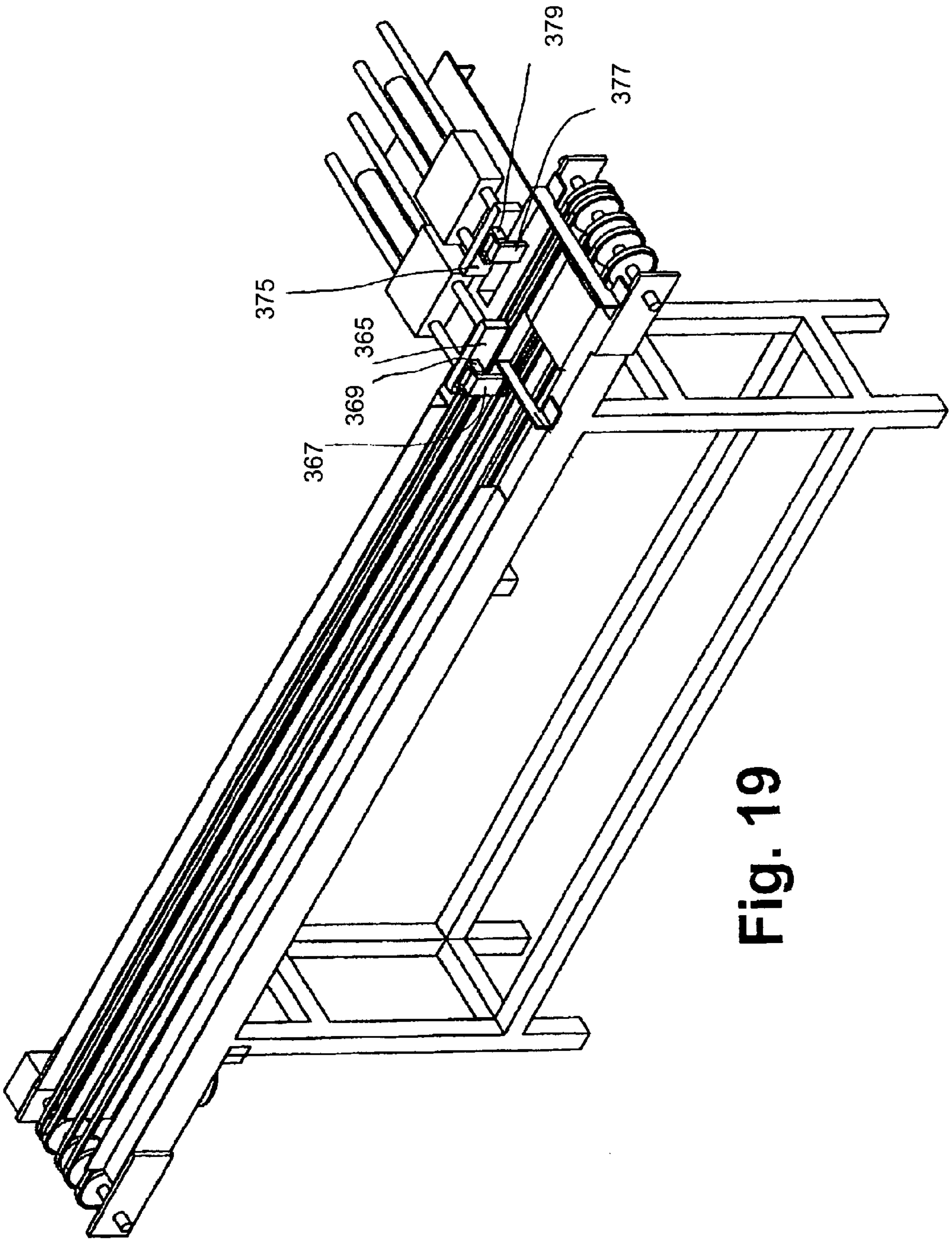
FIG. 19 is close up of the horizontal chain fixtures.

The assembly station 314 is served by the block dispensers or installation apparatuses 360 and 370, which are assembled with the block magazines 366 and 376 in FIGS. 17 and 18. FIGS. 17 and 18 depict a somewhat different version of the block installers than depicted in FIG. 11. In FIGS. 17 and 18 the actuator cylinders 364 and 374 operate within housings 363 and 373 in order to actuate two push rods per installer, push rod pair 362 and push rod pair 372. The push rods then push a panel or extension face 365 and 375 towards the assembly station 314.

Of course deck 312 and assembly station 314 are level with the block magazines 366 and 376. Additionally, in the depicted embodiment, the block magazine 366 and 376 are level with each other. Accordingly, provision must be made to avoid interference of installation of a block from one magazine with the queue of blocks in the other magazine. In the depicted embodiment, this is achieved with the use of pivoted push bars 367 and 377. These are mounted on pivot brackets 369 and 379, which are in turn fixed to panels 365 and 375. Push bars 367 and 377 are mounted to brackets 369 and 379 with a horizontal axle or pair of horizontal pins so that the push bars 367 and 377 may rotate between vertical and horizontal orientations. Gravity holds the push bars 367 and 377 vertical when they are unengaged. A stop (not shown) maintains the push bars 367 and 377 from retrograde rotation from the vertical position towards panels 365 and 375. This fixation allows the push bars 367 and 377 to contact blocks and push them into their assembled position as the block installation devices 360 and 370 are actuated.

The push bars 367 and 377 have a vertical extend sufficiently low to bring them into engagement with a next block in the block magazine. The panels 365 and 375 do not. That is, panel 365 and 375 do not extend far enough down to contact the blocks, and accordingly pass over the blocks during actuation and retraction of the block installation devices 360 and 370.

During the extension of the actuation devices 360 or 370 to push a block into assembly station 314, the vertical push bars 367 and 377 remain vertical, extend into the plane of the block magazines, engage a block and push it into position in assembly station 314. Upon retraction, the panels 365 and 375 pass over the next block, which the magazine has biased downward into a ready position. The push panels 367 and 377 are brought into contact with the next block during retraction. However, because they are hinged, the push panels drag over the top of the next block in the block magazine without pulling any blocks out of their ready position in the magazine. After the block installation devices 360 or 370 have retracted far enough, the push bars 367 and 377 fall off the top of the block they have been dragging over and, by force of gravity, swing back down into their vertical rest position, ready to engage a next block.

FIG. 20 is a close up of one embodiment of the fixtures used to propel a slat and the properly positioned blocks on the slat for attachment. In the depicted embodiment, fixtures 346 and 348 are attached to the horizontal chain 340. Fixture 348A is dimensioned to receive and maintain placement a long block. Similarly, fixture 346A is dimensioned to position a long block. Between fixtures 348A and 346A are fixtures 348B and 348C which are dimensioned to hold in the proper position short blocks. Fixtures 348A, 348B and 348C are dimensioned such that they do not engage the slat, but rather pass over it during the rotation of chain 340. Fixture 346, however, is designed to both hold in position a final long block and engage for driving the slat onto its blocks will be attached. In the depicted embodiment, these fixtures are separate components. Fixture 346A holds in position a final long block. Fixture 346B engages a slat by having a vertical extent sufficient to put the fixture in the plane of the slat. In alternative embodiments, such as that suggested in FIG. 11, fixture 346 may be a single member.

FIG. 21 depicts biasing springs 392. These springs are designed to engage and bias into position the blocks in their proper position against the fixtures 348 and 346 and maintain those proper positions at least until the stapler 384 has fixedly attached them to the slat.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method of assembling a block stringer for a pallet comprising:

providing an automated pallet assembly apparatus having an assembly path, a slat dispensing station, and a block dispensing station, the assembly path operatively connecting the slat dispensing station to the block dispensing station;

providing a plurality of slats to the slat dispensing station of the assembly apparatus, each of the plurality of slats having a longitudinal length, a lateral width, and a transverse thickness, the longitudinal length of each of the plurality of slats defining first and second longitudinal ends of the respective slat;

providing a plurality of blocks to the block dispensing station of the assembly apparatus;

utilizing the assembly apparatus to automatically longitudinally move a first one of the plurality of slats individually along the assembly path from the slat dispensing station toward the block dispensing station and to automatically stop the movement of the first slat at a first position along the assembly path, the first position being such that the first longitudinal end of the first slat is positioned adjacent the block dispensing station along the assembly path;

automatically biasing a first block of the plurality of blocks into engagement with the first slat via the assembly apparatus, the engagement of the first block with the first slat occurring with the first slat stopped in the first position such that the first block engages the first slat adjacent the first longitudinal end of the first slat and automatically fastening the first slat to the first block while the first slat and the first block are being biased into engagement with each other.

2. A block attacher for attaching blocks to slats as stringers for pallets comprising:

a slat dispenser disposed to dispense individual slats to a first individual slat driver, said first slat driver being operative to move said individual slats to an assembly station;

a second slat driver, at least said second slat driver being selectively positionable;

at least one block dispenser, said block dispenser being disposed to dispense a block to said assembly station;

a position fixture disposed to operatively cooperate with said second slat driver and said at least one block dispenser to position the dispensed block abutting the individual slat when said second slat driver is in a first selected position;

at least one other position fixture disposed to operatively cooperate with said second slat driver to position a second dispensed block abutting the individual slat when said second slat driver is in at least one other selected position;

a block fixator disposed to fix said first dispensed block to said slat when said second slat driver is in said first selected position and further disposed to attach said at least one other block to the individual slat when said second slat driver is in said at least one other position.

3. The block attacher of claim 2 wherein said block fixator is at a separate work station from said block dispenser.

4. The block attacher of claim 3 wherein said block fixator is at an attachment station having a clamping device disposed to clamp each dispensed block against the individual slat.

5. The block attacher of claim 2 further comprising a stringer ejector.

6. The block attacher of claim 2 further comprising a second block dispenser.

7. The block attacher of claim 6 wherein said first block dispenser and said second block dispenser are dimensioned to dispense different sized blocks.

8. The block attacher of claim 7 wherein said at least one other position fixture is dimensioned to position a different sized block abutting the individual slat than said first position fixture.

9. The block attacher of claim 2 wherein said first slat driver includes a chain.

10. The block attacher of claim 2 wherein said second slat driver includes a chain.

11. The block attacher of claim 2 wherein said first and second slat drivers both include chains, and said chains turn in operative coordination through a gear set.

12. The block attacher of claim 2 wherein said block dispenser has a piston having a tooth operative for enaaging a block to advance said block.

13. The block attacher of claim 2 wherein said second slat driver comprises at least one drive wheel, said drive wheel engaging a surface of said slat to advance it.

14. The block attacher of claim 2 wherein said position fixtures are on a chain.

15. The block attacher of claim 2 further comprising at least one biasing spring disposed to bias each of the dispensed blocks into each of said position fixtures.

16. A method of producing individual stringers for block pallets comprising:

driving an individual slat to a first selected position;

dispensing a first block to abut the individual slat a preconfigured location on said individual slat when said individual slat is in said first selected position;

maintaining the first block in said first preconfigured location relative to the individual slat;

driving said individual slat to a second selected position;

dispensing a second block to abut the individual slat at a second preconfigured location when said individual slat is at said second selected position;

maintaining the second block on the individual slat at said second preconfigured location;

fixing the first block to the individual slat; and fixing the second block to the individual slat.

17. The method of claim 16 wherein said fixing is by stapling.

18. The method of claim 16 wherein said step of dispensing a first block is by a first block dispenser and said step of dispensing a second block is by a different block dispenser.

19. The method of claim 16 wherein the first dispensed block and the second dispensed block are different dimensions.

20. The method of claim 16 further comprising the step of ejecting a finished stringer.

21. The method of claim 16 wherein said driving step is executed by a drive chain having position fixtures attached thereto.

22. The method of claim 21 wherein said driving step is executed in part by at least one other driver.

23. The method of claim 22 wherein said first and second drivers both include chains, and further comprising connecting said chains through a gear set.

24. The method of claim 16 wherein said slats are dispensed from a magazine, said magazine being adjustable to dispense different size slats.

25. The method of claim 16 further comprising a first block magazine disposed to feed said first block dispenser.

26. The method of claim 25 further comprising a second block magazine disposed to feed said second block dispenser.

27. A block stringer assembler comprising:

a first driver;

a slat dispenser disposed to place the individual slats onto said first driver;

a second driver disposed to receive dispensed individual slats from said first driver;

a first block dispenser disposed to place individual blocks onto the individual slats at a first preconfigured location;

a second block dispenser disposed to place individual blocks on the individual slats at least one other preconfigured location;

a maintenance device disposed to maintain said individual block from said first block dispenser at said first preconfigured location on the individual slat;

at least one other maintenance device disposed to maintain the individual block from said second block dispenser on the individual slat at said at least one other preconfigured location; and a block fixator disposed to fix each of the dispensed blocks to each individual slat at said preconfigured locations.

28. The block stringer assembler of claim 27 wherein said maintenance device is further comprised of a fixture attached to said second driver.

29. The block stringer assembler of claim 28 wherein said maintenance device is further comprised of a spring disposed to bias a dispensed block against said fixture.

30. The block stringer assembler of claim 27 wherein said block fixator is a stapler.

31. The block stringer assembler of claim 27 wherein said block fixator is at a separate station from a station where said individual blocks are dispensed into position on said individual slats.

32. The block stringer assembler of 27 wherein said fixator is disposed to oppose a block compressor, said block compressor being disposed to hold said dispensed blocks in a position abutted against the individual slats.

33. The block stringer assembler of claim 27 further comprising an ejector for ejecting assembled block stringers.

34. The block stringer assembler of claim 27 wherein said slat dispenser is pneumatically driven.

35. The block stringer assembler of claim 27 wherein said block dispensers are pneumatically driven.

36. The block stringer assembler of claim 27 further comprising:

a first block magazine;

a second block magazine;

wherein said first block dispenser is disposed to separate individual blocks from said first block magazine and place said individual blocks onto said individual slats at said first preconfigured location; and wherein said second block dispenser is disposed to separate individual blocks from said second block magazine and place said individual blocks onto said individual slats at said at least one other preconifigured location.

37. The block stringer assembler of claim 36 further comprising a first block magazine drive chain disposed to bias a first magazine of blocks into said first block dispenser such that blocks in said first block magazine may be individually dispensed;

a second block magazine drive chain disposed to bias a second magazine of blocks into said second block dispenser such that blocks in said second block magazine may be individually dispensed.

38. The block stringer assembler of claim 36 wherein said block magazines are horizontal.

39. The block stringer assembler of claim 36 wherein at least one of said first block dispenser or said second block dispenser comprises an extension face, said extension face being dimensioned to clear said first or said second block magazine; and a pivoting push bar assembled on said extension face to dispense individual blocks from said one of said first or said second block magazines when said push bar is driven in a first direction and to pivot out of biasing contact with bocks in said block magazine when said push bar is driven in a second direction.

40. The block stringer assembler of claim 27, further comprising a slat magazine and wherein said slat dispenser is disposed to separate individual slats from said slat magazine and place the individual slats onto said first driver.

* * * * *

UNITED STATES PATENT AND TRADEMARK OFFICE

CERTIFICATE OF CORRECTION

PATENT NO. : 7,165,304 B2
APPLICATION NO. : 10/817188
DATED : January 23, 2007
INVENTOR(S) : Smith et al.

It is certified that error appears in the above-identified patent and that said Letters Patent is hereby corrected as shown below:

| Col./Line No. | Reads | Should Read |
|---|---|---|
| Col. 16, Line 39 | "for enaaging" | -- for engaging -- |

Signed and Sealed this

Twenty-fourth Day of April, 2007

JON W. DUDAS
*Director of the United States Patent and Trademark Office*